(12) United States Patent
Filler et al.

(10) Patent No.: US 12,217,108 B2
(45) Date of Patent: Feb. 4, 2025

(54) LASER MARKING OF MACHINE-READABLE CODES

(71) Applicant: Digimarc Corporation, Beaverton, OR (US)

(72) Inventors: Tomas Filler, Beaverton, OR (US); Vojtech Holub, Lafayette, CO (US); Hugh L. Brunk, Portland, OR (US); Adnan M. Alattar, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 24 days.

(21) Appl. No.: 18/077,914

(22) Filed: Dec. 8, 2022

(65) Prior Publication Data

US 2023/0177297 A1     Jun. 8, 2023

Related U.S. Application Data

(63) Continuation-in-part of application No. 17/339,711, filed on Jun. 4, 2021, now Pat. No. 11,710,020.

(60) Provisional application No. 63/287,289, filed on Dec. 8, 2021, provisional application No. 63/113,700, filed on Nov. 13, 2020, provisional application No. 63/086,534, filed on Oct. 1, 2020, provisional application No. 63/038,735, filed on Jun. 12, 2020.

(51) Int. Cl.
    *G06K 19/06*     (2006.01)
(52) U.S. Cl.
    CPC ............... *G06K 19/06037* (2013.01)
(58) Field of Classification Search
    CPC ............................................... G06K 19/06037
    See application file for complete search history.

(56) References Cited

U.S. PATENT DOCUMENTS

| 4,990,792 A | 2/1991 | Frei |
| 6,590,996 B1 | 7/2003 | Reed |
| 6,791,592 B2 | 9/2004 | Assa |
| 6,884,961 B1 | 4/2005 | Dmitriev |
| 7,065,228 B2 | 6/2006 | Brundage |

(Continued)

FOREIGN PATENT DOCUMENTS

| WO | 2020186234 | 9/2020 |
| WO | 2021078842 A1 | 4/2021 |
| WO | 2021252298 | 12/2021 |

OTHER PUBLICATIONS

Jangsombatsiri, An artificial neural network approach to laser-based direct part marking of data matrix symbols, Oregon State University dissertation, 2004.

(Continued)

*Primary Examiner* — Jamara A Franklin
(74) *Attorney, Agent, or Firm* — Digimarc Corporation

(57) ABSTRACT

A surface is laser-etched to convey a 2D machine-readable code pattern. Various strategies are detailed to minimize the etching time. Some strategies include modifying the code pattern to reduce a path length traveled by the laser. Some strategies include modifying the code pattern to make it sub-optimal, i.e., making the code pattern a less-faithful approximation of an ideal code pattern. In some embodiments the etched surface is the surface of a plastic container, and the code pattern conveys information indicating the type of plastic of which the container is manufactured. A variety of other features and arrangements are also detailed.

20 Claims, 25 Drawing Sheets

(56) References Cited

U.S. PATENT DOCUMENTS

| | | |
|---|---|---|
| 7,403,633 B2 | 7/2008 | Brundage |
| 8,604,380 B2 | 12/2013 | Howerton |
| 9,959,587 B2 | 5/2018 | Sharma |
| 10,217,182 B1 | 2/2019 | Holub |
| 10,242,434 B1 | 3/2019 | Holub |
| 11,710,020 B2 | 7/2023 | Filler |
| 2003/0189692 A1* | 10/2003 | Kawano ............ G02B 26/0841 348/E5.142 |
| 2004/0158724 A1 | 8/2004 | Carr |
| 2005/0001419 A1 | 1/2005 | Levy |
| 2006/0054606 A1 | 3/2006 | Amako |
| 2006/0208090 A1 | 9/2006 | Dahl |
| 2008/0132088 A1 | 6/2008 | Mizuno |
| 2010/0102032 A1 | 4/2010 | Bathelet |
| 2010/0252543 A1* | 10/2010 | Manens ............... B23K 26/082 219/121.68 |
| 2013/0228619 A1 | 9/2013 | Soborski |
| 2015/0246415 A1 | 9/2015 | Hosseini |
| 2018/0345323 A1 | 12/2018 | Kerver |
| 2018/0345326 A1 | 12/2018 | Tsutsumi |
| 2019/0306385 A1 | 10/2019 | Sharma |
| 2019/0332840 A1 | 10/2019 | Sharma |
| 2021/0299706 A1 | 9/2021 | Filler |
| 2021/0387399 A1 | 12/2021 | Filler |
| 2022/0055071 A1 | 2/2022 | Sharma |
| 2022/0138892 A1 | 5/2022 | Kamath |
| 2022/0331841 A1 | 10/2022 | Filler |

OTHER PUBLICATIONS

Reginald et al, A critical review of multi-hole drilling path optimization, Archives of Computational Methods in Engineering. Apr. 2019;26(2):449-59.

Wang, et al, Research on laser marking speed optimization by using genetic algorithm, PloS one. May 8, 2015;10(5).

Xiaomao, et al, Tool path planning based on endpoint build-in optimization in rapid prototyping, Proc. of the Institution of Mechanical Engineers, Part C: Journal of Mechanical Engineering Science. Dec. 2011;225(12):2919-26.

Excerpts from corresponding PCT application PCT/US2021/036029 (WO2021252298).

U.S. Appl. No. 17/897,552, filed Aug. 29, 2022 (68 total pages).

U.S. Appl. No. 63/038,735, filed Jun. 12, 2020, including an Appendix (109 total pages).

* cited by examiner

| 115 |     |     |     | 30  |     |     | 117 |
|-----|-----|-----|-----|-----|-----|-----|-----|
|     |     | 51  |     |     | 94  | 126 |     |
|     | 108 | 121 |     |     | 105 |     | 79  |
|     |     | 22  | 69  | 103 | 108 | 116 |     |
|     | 81  |     |     |     |     | 58  | 77  |
|     |     | 127 | 66  |     | 127 | 124 | 111 |
| 124 | 104 |     | 122 |     |     | 127 | 70  |
| 58  | 121 |     |     | 47  | 127 |     |     |

| TABLE 2A - CANDIDATE LOCATIONS WITH EMPTY NEIGHBORS ||| TABLE 2B - CANDIDATE LOCATIONS WITH OCCUPIED NEIGHBOR(S) |||
|---|---|---|---|---|---|
| RANK | VALUE | LOCATION | | | |
| 1 | 22 | (4,3) | | | |
| 2 | 30 | (1,5) | | | |
| 3 | 47 | (8,5) | | | |
| 4 | 51 | (2,3) | | | |
| 5 | 58 | (5,7) | | | |
| 6 | 58 | (8,1) | | | |
| 7 | 66 | (6,4) | | | |
| 8 | 69 | (4,4) | | | |
| 9 | 70 | (7,8) | | | |
| 10 | 77 | (5,8) | | | |
| 11 | 79 | (3,8) | | | |
| 12 | 81 | (5,2) | | | |
| 13 | 94 | (2,6) | | | |
| 14 | 103 | (4,5) | | | |
| 15 | 104 | (7,2) | | | |
| 16 | 105 | (3,6) | | | |
| 17 | 108 | (3,2) | | | |
| 18 | 108 | (4,6) | | | |
| 19 | 111 | (6,8) | | | |
| 20 | 115 | (1,1) | | | |
| 21 | 116 | (4,7) | | | |
| 22 | 117 | (1,8) | | | |
| 23 | 121 | (3,3) | | | |
| 24 | 121 | (8,2) | | | |
| 25 | 122 | (7,4) | | | |
| 26 | 124 | (6,7) | | | |
| 27 | 124 | (7,1) | | | |
| 28 | 126 | (2,7) | | | |
| 29 | 127 | (6,3) | | | |
| 30 | 127 | (6,6) | | | |
| 31 | 127 | (7,7) | | | |
| 32 | 127 | (8,6) | | | |

FIG. 16

| TABLE 2A - CANDIDATE LOCATIONS WITH EMPTY NEIGHBORS | | |
|---|---|---|
| RANK | VALUE | LOCATION |
| 3 | 47 | (8,5) |
| 4 | 51 | (2,3) |
| 5 | 58 | (5,7) |
| 6 | 58 | (8,1) |
| 7 | 66 | (6,4) |
| 9 | 70 | (7,8) |
| 10 | 77 | (5,8) |
| 11 | 79 | (3,8) |
| 12 | 81 | (5,2) |
| 14 | 103 | (4,5) |
| 15 | 104 | (7,2) |
| 16 | 105 | (3,6) |
| 18 | 108 | (4,6) |
| 19 | 111 | (6,8) |
| 20 | 115 | (1,1) |
| 21 | 116 | (4,7) |
| 22 | 117 | (1,8) |
| 24 | 121 | (8,2) |
| 25 | 122 | (7,4) |
| 26 | 124 | (6,7) |
| 27 | 124 | (7,1) |
| 28 | 126 | (2,7) |
| 29 | 127 | (6,3) |
| 30 | 127 | (6,6) |
| 31 | 127 | (7,7) |
| 32 | 127 | (8,6) |

| TABLE 2B - CANDIDATE LOCATIONS WITH OCCUPIED NEIGHBOR(S) | | |
|---|---|---|
| 8 | 69 | (4,4) |
| 13 | 94 | (2,6) |
| 17 | 108 | (3,2) |
| 23 | 121 | (3,3) |

FIG. 18

| TABLE 2A - CANDIDATE LOCATIONS WITH EMPTY NEIGHBORS | | |
|---|---|---|
| RANK | VALUE | LOCATION |
| | | |
| | | |
| | | |
| 4 | 51 | (2,3) |
| 5 | 58 | (5,7) |
| 6 | 58 | (8,1) |
| 7 | 66 | (6,4) |
| | | |
| 9 | 70 | (7,8) |
| 10 | 77 | (5,8) |
| 11 | 79 | (3,8) |
| 12 | 81 | (5,2) |
| | | |
| 14 | 103 | (4,5) |
| 15 | 104 | (7,2) |
| 16 | 105 | (3,6) |
| | | |
| 18 | 108 | (4,6) |
| 19 | 111 | (6,8) |
| 20 | 114 | (1,1) |
| 21 | 116 | (4,7) |
| 22 | 117 | (1,8) |
| | | |
| 24 | 121 | (8,2) |
| | | |
| 26 | 124 | (6,7) |
| 27 | 124 | (7,1) |
| 28 | 126 | (2,7) |
| 29 | 127 | (6,3) |
| 30 | 127 | (6,6) |
| 31 | 127 | (7,7) |
| | | |

| TABLE 2B - CANDIDATE LOCATIONS WITH OCCUPIED NEIGHBOR(S) | | |
|---|---|---|
| | | |
| | | |
| | | |
| | | |
| | | |
| | | |
| | | |
| 8 | 69 | (4,4) |
| | | |
| | | |
| | | |
| | | |
| | | |
| 13 | 94 | (2,6) |
| | | |
| | | |
| | | |
| | | |
| 17 | 108 | (3,2) |
| | | |
| | | |
| | | |
| | | |
| | | |
| 23 | 121 | (3,3) |
| 25 | 122 | (7,4) |
| | | |
| | | |
| | | |
| | | |
| | | |
| | | |
| 32 | 127 | (8,6) |

FIG. 20

| TABLE 2A - CANDIDATE LOCATIONS WITH EMPTY NEIGHBORS | | |
|---|---|---|
| RANK | VALUE | LOCATION |
| | | |
| | | |
| | | |
| 4 | 51 | (2,3) |
| 5 | 58 | (5,7) |
| 6 | 58 | (8,1) |
| 7 | 66 | (6,4) |
| | | |
| 9 | 70 | (7,8) |
| 10 | 77 | (5,8) |
| 11 | 79 | (3,8) |
| 12 | 81 | (5,2) |
| | | |
| | | |
| 15 | 104 | (7,2) |
| 16 | 105 | (3,6) |
| | | |
| 18 | 108 | (4,6) |
| 19 | 111 | (6,8) |
| 20 | 115 | (1,1) |
| 21 | 116 | (4,7) |
| 22 | 117 | (1,8) |
| | | |
| 24 | 121 | (8,2) |
| | | |
| 26 | 124 | (6,7) |
| 27 | 124 | (7,1) |
| 28 | 126 | (2,7) |
| 29 | 127 | (6,3) |
| 30 | 127 | (6,6) |
| 31 | 127 | (7,7) |

| TABLE 2B - CANDIDATE LOCATIONS WITH OCCUPIED NEIGHBOR(S) | | |
|---|---|---|
| | | |
| | | |
| | | |
| | | |
| | | |
| | | |
| | | |
| | | |
| | | |
| | | |
| | | |
| | | |
| 13 | | (2,6) |
| 14 | | (4,5) |
| | | |
| 17 | | (3,2) |
| | | |
| | | |
| | | |
| | | |
| | | |
| | | |
| 23 | | (3,3) |
| | | |
| 25 | | (7,4) |
| | | |
| | | |
| | | |
| | | |
| | | |
| | | |
| 32 | | (8,6) |

FIG. 22

351 REFERENCE SIGNAL COMPONENT

352 INTERPOLATED PAYLOAD COMPONENT

353 REFERENCE + 0.1253(PAYLOAD)

LASER MARKING OF MACHINE-READABLE CODES

RELATED APPLICATIONS

This application claims priority from provisional application No. 63/287,289, filed Dec. 8, 2021. This application is also a continuation-in-part of application Ser. No. 17/339,711, filed Jun. 4, 2021 (U.S. Pat. No. 11,710,020), which claims priority from provisional applications 63/113,700, filed Nov. 13, 2020, 63/086,534, filed Oct. 1, 2020, and 63/038,735, filed Jun. 12, 2020.

The present technology continues and expands on work detailed in applicant's earlier work detailed in applications 20220055071, 20210299706 and 20220331841.

The foregoing documents are incorporated herein by reference, and the present specification should be understood to encompass the text and drawings of those documents.

BACKGROUND AND INTRODUCTION

Plastic bottles are commonly shaped by molds. As detailed in applicant's U.S. patent publication 20190306385, a bottle mold can be engraved or milled so that it also imparts a machine-readable code, e.g., by a 2D pattern of raised or depressed markings. One application of such a code is to identify a bottle by plastic type, so that the bottle can automatically be sorted in a recycling facility.

A single mold may be used to produce thousands of identical bottles. Sometimes, however, it is desirable to customize bottles, such as by giving each bottle a unique identifier. This is useful, for instance, when a bottle is intended for re-use. A processing facility can track the bottle by reading its identifier, and retire the bottle from service after it has reached a predetermined age or a predetermined number of refills. See, e.g., patent publication US 20180345326.

Laser etching can be used to mark a bottle with such an identifier. This typically involves a 9.3 µm carbon dioxide laser whose beam is steered by a pair of mirrors, in raster fashion, across an area to be marked (e.g., a one-inch square area), and activated as needed to form the individual marks comprising a 2D machine-readable indicia. There may be hundreds or thousands of such individual marks. Such etching commonly takes about one second to mark a single square inch.

A single second doesn't sound like much. But given the large number of bottles that sometimes must be marked, together with other intervals involved in the marking process (e.g., the time needed to move each bottle into place for laser marking), single seconds can become hours or days, or longer. And more than a single square inch may sometimes be marked on each bottle.

It would be desirable to laser-etch bottles and other items with machine-readable codes more quickly.

In accordance with a first aspect of the present technology, a plural-symbol payload is represented in a sub-optimal 2D code, wherein sub-optimality of said code reduces a distance that a laser must travel to etch the code on a substrate, such as a bottle or other container.

In an illustrative embodiment employing such aspect of the technology, the 2D code comprises a plurality of marks, and the method includes selecting locations of the marks to approximate an ideal code pattern (which may be a continuous-tone watermark pattern). The sub-optimality is caused by selecting a relatively inferior, rather than a relatively superior, location, for at least one of the marks. Such selection of a relatively inferior, rather than a relatively superior, location for the mark yields a 2D code that less faithfully approximates the ideal code pattern.

In accordance with a second aspect of the technology, a physical substrate is encoded using a plurality of elongated markings that collectively represent a machine-readable code. The angles of the elongated markings are selected to minimize a laser etching path length through the markings.

In accordance with further aspects of the technology, a selection of marks to represent a 2D code on a physical substrate is made to favor clustering of marks, or to favor alignment of marks along vertical lanes.

In accordance with yet another aspect of the technology, a bottle or other workpiece is marked by two lasers that operate simultaneously yet independently, to etch different regions of a single 2D code on the bottle.

The foregoing and many other aspects of the present technology will be more readily apparent from the following detailed description, which proceeds with reference to the accompanying drawings.

BRIEF DESCRIPTION OF THE DRAWINGS

FIG. 5 illustrates a binary watermark pattern in which mark locations have been selected so that marking speed is constrained only by vertical movement speed.

FIGS. 6-11 illustrate an excerpt of a watermark pattern, variously-marked to illustrate aspects of a swath-based mark selection algorithm for producing the binary watermark pattern of FIG. 5.

FIGS. 15-23 detail aspects of an algorithm to promote clustering of marks in a binary watermark pattern.

DETAILED DESCRIPTION

Figure 2:
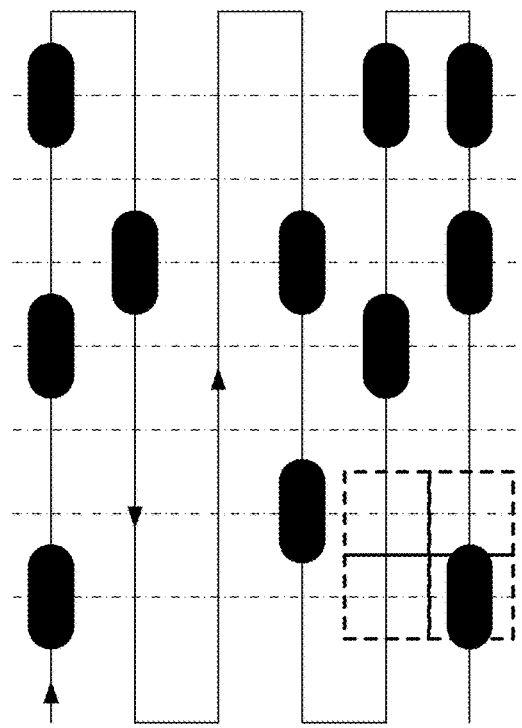
FIG. 2 shows how the nodes indicated in FIG. 1 can be marked by a laser etching apparatus that visits each array node in raster fashion.

Laser marking systems are well-known, and so conventional features associated with such systems aren't belabored in the following discussion. The reader wishing more information is referred to the Wikipedia article Laser Engraving, which is attached as an appendix to U.S. application 63/038,735 and forms part of this specification.

The present technology is illustrated with reference to marking plastic bottles (e.g., bottles formed of polyethylene terephthalate, or PET) with a 2D machine-readable symbology. An illustrative 2D symbology is a binary (sometimes termed "sparse") watermark pattern, of which several varieties are disclosed in applicant's U.S. patent publication 20190332840. Except as otherwise specified, however, the present technology is not limited to use with plastic bottles, nor to use with the detailed binary watermark patterns. Any substrate may be so-marked, to form any type of 2D symbology.

As used herein, 2D symbology refers to a machine-readable code spanning a 2D area, commonly with a bitonal marking, and encoding a plural symbol payload that can be extracted by a compliant decoder from imagery depicting the symbology. 2D symbologies conventionally include error correction data, which enable certain decoding errors to be detected and corrected. In addition to the cited binary watermark patterns, 2D symbologies include codes such as DotCode, MaxiCode and Xerox glyph patterns, etc. A further 2D symbology is the sparse path family of codes detailed in application Ser. No. 17/897,552, filed Aug. 29, 2022.

If dirt, stray markings, or optical aberrations render an imaged 2D symbology different than the symbology originally-formed, this is generally of no consequence because the error correction data enables the decoder to compensate for such loss of fidelity in the code and still extract the original message.

This robustness to imperfection is exploited in a new way in certain embodiments of the present technology. In such embodiments, applicant alters the arrangement of marks comprising the 2D symbology so as to reduce the distance that must be traveled by an etching laser. While the resulting symbology is different than an ideal counterpart, the change is slight enough that the code's functionality is preserved, while speeding the laser etching process. We term such a code "sub-optimal" herein, meaning that there exists an alternative code, comprising marks of the same size and number, spanning the same size area, that has a technically higher decoding reliability in the presence of additive Gaussian noise. For most intents and purposes, however, the two codes are interchangeable.

Before proceeding further, it is helpful to review aspects of watermark technology. As detailed in cited U.S. publication 20190332840, an illustrative binary watermark pattern is a derivative of a so-called continuous tone watermark signal (pattern). The continuous tone pattern has two parts: a synchronization signal and a message signal. The synchronization signal is a summation of many 2D sinusoids (e.g., 16, 24 or 64) of different frequencies and phases. (Integer frequencies are desirably used, to permit seamless tiling of resultant blocks to span arbitrarily large areas of substrate.) When imagery depicting such pattern is transformed into a spatial frequency domain (as by a fast Fourier transform), the individual sinusoid components form a constellation of points in the (u,v) plane. The scale and rotation of this constellation, as compared to original values, reveal the scale and rotation at which the watermark pattern is depicted in the imagery. The phases of these points in the (u,v) plane indicate the translation, in x- and y-directions, at which the watermark pattern is depicted in the imagery. U.S. Pat. Nos. 6,590,996, 9,959,587 and 10,242,434 provide further information on these and other topics.

The message signal part of an exemplary continuous tone watermark pattern starts with a binary message, e.g., of 47 bits, which is concatenated with 24 corresponding CRC bits, and then convolutionally-encoded with a base rate of 1/13 to yield a series of 924 bits. 100 further bits, indicating a version identifier, are appended, yielding 1024 "signature" bits. Each of these bits is modulated with a sixteen element bipolar $\{+1/-1\}$ noise sequence, yielding 16 bipolar "chips." Each of these chips is mapped to a different location within a 128×128 location array by a scatter table (i.e., one "chip" for each of the 16,384 locations).

The 2D synchronization and message signals are combined by first sampling the synchronization signal at 16,384 uniformly-spaced points corresponding to the 128×128 message signal array. At each location a weighted sum is formed between the synchronization signal value (which may be a floating point number ranging between −1 and +1) and the chip value (−1 or +1) at each point. An 8:1 weighting is exemplary, with the synchronization signal dominating. The resultant weighted sum can be scaled, e.g., to a range of −1 to +1, and forms the continuous tone watermark signal. (The signal is termed "continuous tone" since it is based on a floating point range of values. However, in some embodiments the signal may be quantized, e.g., to 8-bit greyscale values centered at 128.)

From such a continuous tone watermark signal, or its two original components, a corresponding binary watermark pattern can be derived by various techniques, as detailed in U.S. publication 20190332840.

One technique is simply to apply a thresholding operation, identifying the locations in the continuous tone watermark having the lowest (darkest) values (i.e., the most-negative, in the case of values between −1 and +1, or the values closest to zero in an 8-bit greyscale representation). At each such low-valued location, a dark mark is formed. Other locations are left unmarked. By varying the threshold, the binary watermark pattern can be made darker or lighter (i.e., by increasing or decreasing the number of marks). Such a watermark pattern may be termed a simply-thresholded binary watermark.

A second technique starts with the two separate 128×128 inputs. One is a synchronization signal block, with floating point values between −1 and +1, sampled at a 128×128 array of points. The other is the 128×128 array of payload chip values, having values of black and white (i.e., −1 and +1, or 0 and +1). The darkest (most negative) "x"% of the synchronization signal locations are identified, and set to black; the others are set to white. Spatially-corresponding elements of the two blocks are ANDed together to find coincidences of black elements between the two blocks. Marks (e.g., dark marks) are formed in an output block at these locations of black coincidence; the other locations in the 128×128 array are left unmarked (e.g., white). By setting the value "x" higher or lower, the output signal block can be made darker or lighter. Such a code may be termed an ANDed, or a Type 1, binary watermark.

Another technique samples the 2D synchronization signal not in a 128×128 array, but at a higher resolution—such as a resolution at which the pattern will ultimately be rendered. For example, if the pattern will be rendered to span a square that is 1.1 inches on a side, with a rendering resolution of 1200 ppi, then the synchronization signal is sampled in a 1320×1320 array. The 128×128 array of −1/+1 payload chip values is also processed to match this 1320×1320 array size, e.g., using bilinear interpolation, which results in conversion of the binary chip values to floating point values between −1 and +1. These two components are weighted (as above) and summed. The N locations having the lowest values, within the summed 1320×1320 array, are identified for marking. (The location values may be thresholded to identify which should be marked. Alternatively, locations may be chosen in order, lowest-first, until a desired number of locations have been identified for marking.) Such a code may be termed an interpolated, or a Type 2, binary watermark.

Yet another technique sorts samples within a 128×128 array of synchronization signal samples by value (darkness), yielding a ranked list of the darkest N locations (e.g., 1600 locations), each with a location within the 128×128 array. The darkest of these N locations may be always-marked in an output block (e.g., 400 locations, or P locations), to ensure the synchronization signal is strongly expressed. The others of the N locations (i.e., N-P, or Q locations) are marked, or not, depending on values of message signal data (chips) that are mapped to such locations (e.g., by a scatter table in the encoder). Locations in the sparse block that are not among the N darkest locations (i.e., neither among the P or Q locations) are not selected for marking (although they may be traversed by an energized laser), and they are consequently affirmatively ignored by the decoder. By setting the number N larger or smaller, sparse marks with more or fewer dots are produced. This embodiment may also be termed a Type 3 binary watermark.

These and other techniques are further detailed in U.S. publication 20190332840.

It will be recognized that the greater the number of locations selected for marking, the more faithfully the binary watermark signal will mimic, or approximate, the corresponding continuous tone watermark signal to which it corresponds. But there is a point of diminishing returns, and selection of additional points eventually becomes a hindrance rather than a help (e.g., as the entire area of the watermark becomes flooded with adjoining marks).

We sometimes refer to "dot density" of a binary mark to indicate the relative darkness of the marking pattern. In an array of 128×128 locations (corresponding to the 16,384 binary chip values) up to about 8,192 locations might be marked with dots (marks). We term this a dot density of 100, i.e., 100% of candidate dot locations are marked. A dot density of 20 indicates 20% of 8,192 locations are marked, or about 1600 marks. Dot densities of between about 2 and 30 are most commonly used (as a compromise between visibility and signal robustness), which correspond to between about 150 and 2500 marks in a single watermark block. (Such blocks may be tiled edge-to-edge to span an area of arbitrary size.)

Figure 1:
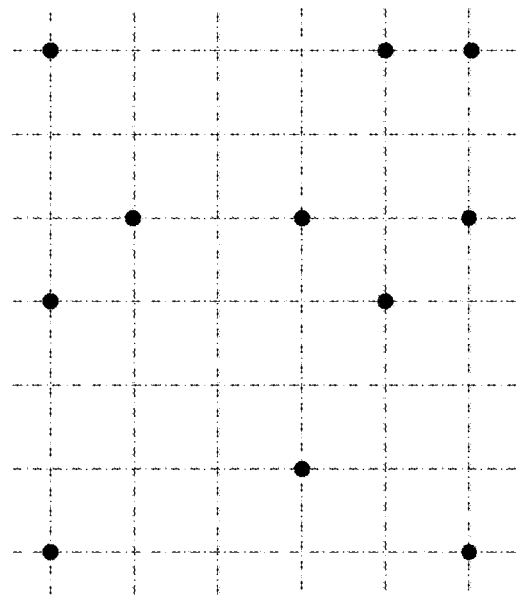
FIG. 1 shows nodes within a 2D array that are to be marked to form a binary watermark pattern.

FIG. 1 shows an excerpt of an exemplary binary watermark pattern produced by one of the just-described methods. The dashed lines show the rows/columns of the 128×128 locations on which the marks are typically formed. (The illustrated pattern is actually denser in dots than most patterns, as it includes 11 dots within 42 array locations. A dot density of 100 would, on average, mark 21 array locations, so the depicted pattern has a dot density of 11/21, or 52, which is higher than the usual 2-30 bounds noted above.)

Robustness of watermark patterns, like those just-described, can be assessed by adding increasing levels of Gaussian noise to imagery depicting a watermark pattern, to determine the noise level at which correct payload decoding falls below 50%. The larger this noise level at which the payload can still be correctly decoded 50% of the time, the more robust is the watermark pattern. Such assessments are performed over dozens or hundreds of trials, and averaged, to yield a reliable metric. See, e.g., U.S. Pat. No. 10,217,182.

Turning now to the physical marking process, a laser marking machine usually has two modes of operation: marking and moving. In the marking mode the laser is activated and moved (typically by mirrors) at one speed, e.g., 5 meters per second. In the moving mode the laser is commonly moved (with the laser un-activated) at a much higher speed, e.g., 15 meters per second. The slower speed used during marking enables greater positioning accuracy, e.g., reducing momentum-induced errors. In marking a binary watermark pattern with a laser that is turned on and off, most of the time is consumed in the moving mode with the laser off—despite its faster rate of speed.

An illustrative marking machine may have a positioning resolution of 1200 points per inch. That is, the mirrors can direct the laser beam to locations defined by a virtual 1200×1200 array of points spanning each square inch on the substrate. As noted, dots fall on nodes in a square 128×128 lattice in the above-described binary watermark patterns. A raster pattern visiting such locations may scan back and forth in opposite directions, along every tenth row in the machine's virtual 1200 PPI coordinate system. That is, it may start scanning in a first direction (e.g., left to right) along row 1 in the machine's 1200 PPI coordinate system, activating the laser as necessary to etch the occasional marks. At the end of row 1 it moves down to row 11 and repeats the process, scanning in the opposite (right to left) direction. At the end of that row it moves down to row 21 and executes a scan in the original direction. And so forth, until it finally etches marks along row 1271 in the machine's coordinate system—finishing the 128 rows of the binary watermark pattern. At the 1200 PPI resolution of the marking system's coordinate system, this final row is 1271/1200=1.059 inches from the first row, so the watermark pattern thereby formed measures 1.059 inches on a side.

(Instructions to control the laser in raster fashion can be generated by inputting a list of {x,y} coordinates where marks are to be formed, and sorting by x, and then by y. The laser is then instructed to visit each location in the list in the resulting sorted order.)

The size of a mark formed by a laser is primarily a function of the laser focusing optics. The larger the area illuminated by the laser, the larger will be the area of the resulting mark. The power of the laser, its wavelength, and the time interval that a point on the surface is illuminated, determine the degree to which an area of illuminated plastic will be changed by the laser. A low power, or a brief exposure, warms the surface enough to crinkle it. Increased exposure leads to boiling of the plastic, forming a tortured, bubbled (foamed) surface that freezes into place when cooled. Further exposure vaporizes the plastic, removing material from the surface, with a boiled/burnt residue underneath the vaporized layer. With enough vaporization the surface is eventually cut through.

FIG. 2 shows that marks used in the present technology need not be round dots. They can be elongated, or any other shape. The depicted marks are line segments, which may have a length of one watermark element (waxel), and a width of a half waxel. The ends are round due to the laser optics, which in this example form a circular illumination area. The rounding at the ends of each line segment causes each segment to extend slightly beyond the confines of a single waxel cell (four of which are shown by dashed lines in the lower left of FIG. 2).

Each line segment is centered on a node in the 128×128 element array. In tracing the raster path (shown by the fine horizontal lines), the marking apparatus activates the laser a half-waxel before it reaches the center of each waxel (node) that is to be marked, and maintains the laser in its active state until a half-waxel following the center of the waxel. (As noted, during this marking phase of operation the apparatus moves the laser at a speed of 5 meters/second. At other locations in the raster pattern the laser target is repositioned at a speed of 15 m/s.)

One approach to speeding the marking process is to shorten the path length on the substrate traveled by the laser. One particular technique is to not visit every possible marking location in a raster scan. A traveling salesman path can be used instead.

Figure 3:
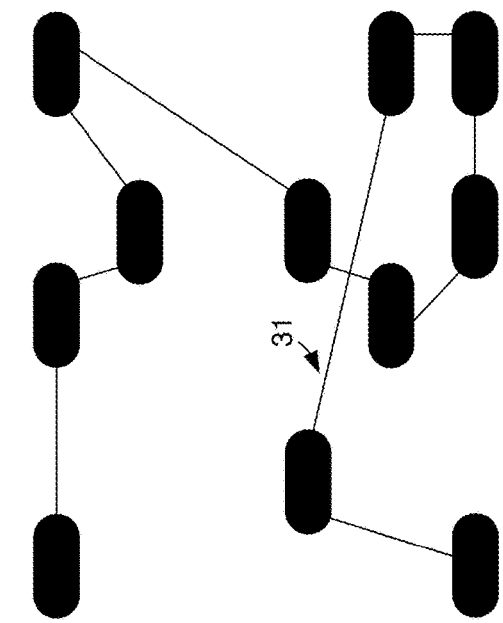
FIG. 3 illustrates how the raster pattern of FIG. 2 can be greatly shortened by visiting only the nodes that are to be marked.

The traveling salesman is a well-studied problem that concerns finding a short path to visit each of a plurality of points. A simple, although not optimum, solution is to progress from point to point by always choosing, as the next point to visit, the point that is physically closest among the points that haven't yet been visited. Such a path is shown in FIG. 3. Use of a traveling salesman path, rather than a raster path, can speed etching by a factor on the order of 10 times.

In accordance with one aspect of the present technology, applicant determines this nearest-neighbor path N different ways, for a code having N marks, and uses the one with the shortest path length. The N different ways are determined by executing the nearest-neighbor algorithm starting at each of the N different marks. Applicant has found that that this can result in a shortening of path length of several percent, as compared with using a path from a randomly-chosen starting point. Such technique may be termed a "best of N nearest neighbor paths" technique.

A path as described above can be further optimized by techniques such as gradient descent and simulated annealing. The latter approach is typically preferred due to its quicker execution, and involves making pseudo-random changes to the best-known path in a statistically-informed manner to try and identify an approximate optimization. Such technique, which is further detailed in the Wikipedia article "Simulated Annealing" attached as an appendix to application 63/038,735, can typically reduce the path length by a further 5%-15%.

In a particular variation of the nearest neighbor path, each mark to be etched is identified by two locations: the location at which laser etching of the mark is to begin, and the location at which laser etching of the mark is to end—subject to the constraint that once one of the two ends of a mark is reached, the path must next extend to the other end of that mark. For each mark, two nearest neighbor paths can be considered—one starting at one endpoint, and one starting at the other. Whichever yields the shortest total distance can be adopted. (The same heuristic can be applied in other searches for shortest paths—try visiting each location from one segment endpoint, and the other, to determine which is shorter, e.g., traversing a segment right-to-left, or left-to-right.)

Figure 3A:
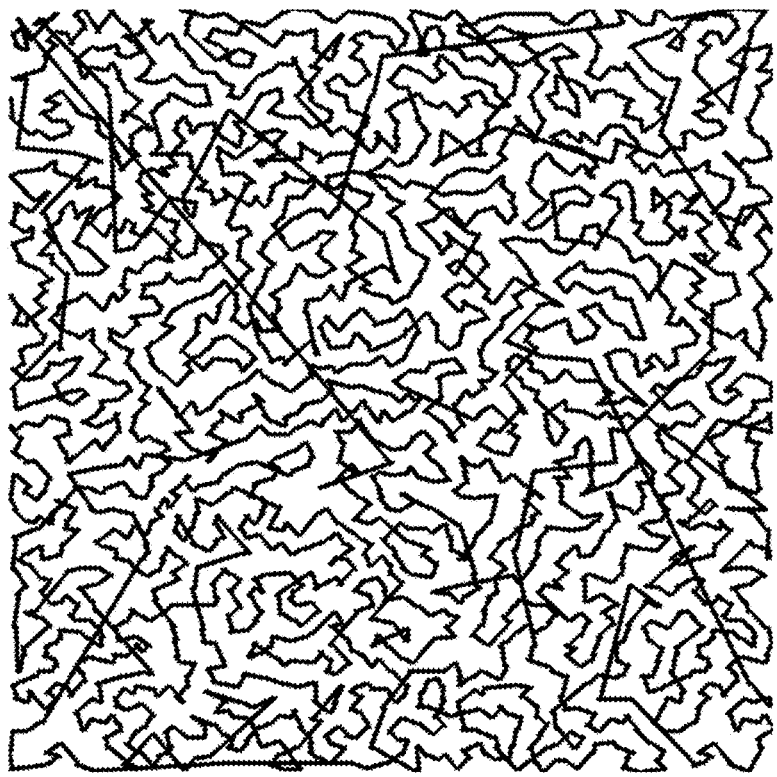
FIG. 3A shows a nearest neighbor path through a set of points.

Nearest neighbor paths commonly involve a series of short connections, interspersed with a lengthy connection into a different neighborhood, where marking with short connections resumes. The lengthy connection is typically more than twice the length of the average connection path between marks. An example is shown at 31 in FIG. 3. Another example is shown in FIG. 3A. The lengthy connections can give an undesirable, scratchy appearance to the finished product.

Figure 3B:
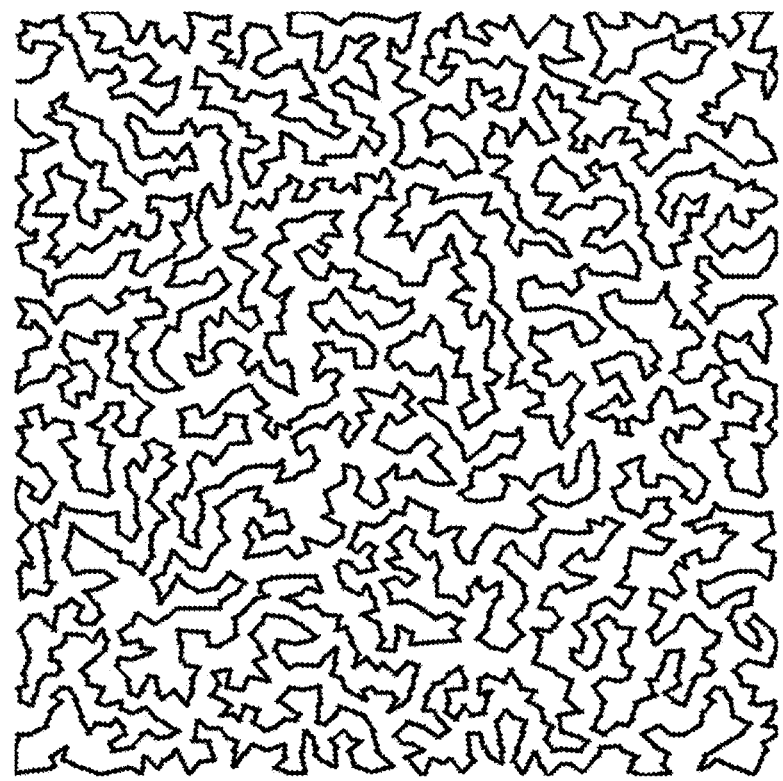
FIG. 3B shows a path through a set of points determined by application of the Lin-Kernighan algorithm.

More aesthetic results can generally be achieved by approaches that tend to avoid such lengthy connections. One such approach is the so-called Lin-Kernighan algorithm (LKH). FIG. 3B shows a routing that results from application of the LKH technique. No long connections are present.

A variety of other such techniques are known. See, e.g., the algorithms reviewed in the Wikipedia article for the Travelling Salesman Problem, such as Lin-Kernighan-Johnson, Held-Karp, the algorithm of Christofides and Serdyukov, and the Concorde TSP Solver. (The Wikipedia article is attached as an appendix to U.S. application 63/038,735 and forms part of the present application.)

It will be recognized that the laser is not turned on and off in the examples of FIGS. 3A and 3B. Rather, it is energized continuously. As discussed below, applicant has found this mode of operation speeds etching.

(Although it is subtle given the scale of presentation, the paths of FIGS. 3A and 3B each draw a short line segment at each vertex in the path. The short segment can be centered at the vertex point, or can have one of its ends located at the vertex point.)

An enhanced method for determining an optimized traveling salesman path through a binary watermark pattern is to generate a binary watermark pattern that represents a thresholded counterpart of the synchronization signal component of the watermark alone—without any contribution from a payload signal. (The threshold can be set higher or lower depending on the density desired.) The resulting pattern may be regarded as an average of all possible patterns, to which different payloads will simply add random variations. A nearly-optimum (or optimum) path through coordinates in this synchronization watermark pattern is then found, using a time-consuming algorithmic analysis such as simulated annealing. This may take an hour or more of computer processing. Once such a path is found, it is used as a starting path from which other paths can be derived.

More particularly, locations for marks in a desired binary watermark pattern are next generated—including both synchronization and payload components. This pattern will omit some locations found in the synchronization-only binary pattern, and may add some other, new locations. (For a Type 3 mark, no locations are added. All marks are at locations of synchronization signal extrema.) Many points will be found in common in both marks. These common points are visited in the same order as determined in the time-consuming algorithmic analysis. This ordering serves as a constraint that greatly limits the number of possible paths through the desired watermark pattern. Subject to this constraint, the newly-added points are added to the path based on their spatial proximity to the points found to be in common. Such approach yields a well-optimized solution, while being simple and quick to perform.

There are several variations on this constraint-based approach. For example, each new point can be exhaustively tried at each location in the path through the common points, to find which ordering yields the shortest path. Or each new point can be trial-inserted in all paths that pass within a threshold spatial distance of the new point. Or the watermark pattern block can be divided into a checkerboard of smaller sub-blocks, and an exhaustive trial of all candidate routings within each such sub-block can be performed. Results achieved by any of these approaches can be refined further by simulated annealing.

(Checkerboard-based optimization can be used in other of the arrangements detailed herein—not just in the particular context discussed above.)

Figure 4:
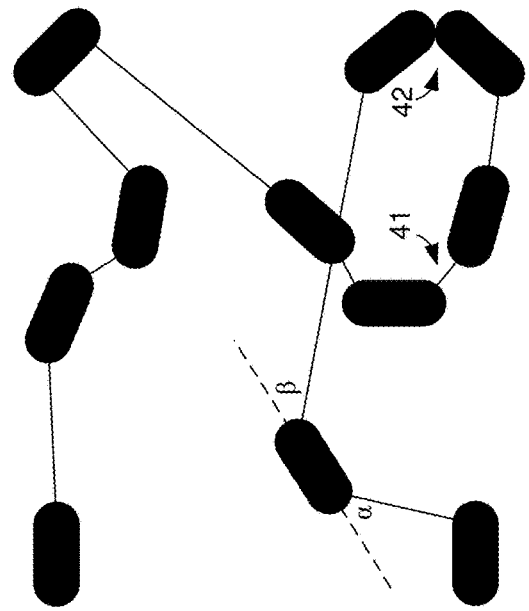
FIG. 4 illustrates how the markings of FIG. 3 can be inclined in accordance with orientations of connections in the marking path, to reduce the length of the marking path.

Another approach to speeding the marking process is to vary the configuration of the marks in accordance with the path(s) to and/or from that location. An example is shown in FIG. 4. Here each mark is centered on a node to be marked, but is inclined at an angle calculated to shorten the total path length to preceding and following marks in a traveling salesman path.

More particularly, the paths connecting a marked node to preceding and following marked nodes intersect at the node, and define an angle of between 0 and 180 degrees. This angle is bisected with an imaginary line. The mark formed at the subject node is rotated to be perpendicular to this imaginary line. Such orientation reduces the sum of (a) the length of the connection between the preceding node and one end of the subject mark, and (b) the length of the connection between the opposite end of the subject mark and the following node. Results of such algorithm, when applied to the array of marks shown in FIG. 3, yields the array of re-oriented marks shown in FIG. 4. Notice that some of the connecting paths are shortened substantially, as denoted at 41 and 42 in the figure.

The algorithm just-described sets the angle of a line segment mark, and thus the location of its two endpoints, based on the relationships between the two connecting paths and the node on which the mark is centered. This is a good approximation of the optimum mark angle, but in actual practice the minimum summed path length is achieved when the angle of the mark relative to the path connecting to the previous mark equals the angle of the mark relative to the path connecting to the next mark. That is, referring to FIG. 4, optimality is achieved when angles α and β are equal. A bit of trigonometry provides a precise solution. Normally, such further optimization provides little benefit if the path lengths are long relative to the mark length (e.g., the former is two or more times the latter—unlike the situations denoted at 41 and 42).

Inclining the marks at different angles has been found to reduce the total path length by on the order of 6%, when the marks are one waxel in length, and the dot density of marks is set to 20. In exemplary embodiments, marks are angled at five, nine, or more different angles.

The foregoing approaches to reducing path length have been described in connection with mark locations selected by one of the earlier-discussed algorithms, yielding Type 1, Type 2, Type 3, or simply-thresholded binary watermark patterns. Such mark selection algorithms are optimum in the sense that they seek to utilize the darkest locations in the corresponding continuous-tone watermark pattern. That is, the darkest locations are given priority for marking. None of the dark extrema among the node values (considering the synchronization signal value, or more usually the combined [synchronization+payload] signal value) is omitted from consideration. (We here assume coding of a substrate area in which no keep-out zone, as discussed in U.S. publication 20190332840, is present.)

But significant reductions in etching path length can be achieved by violating this precept and making the marking sub-optimal, e.g., by permitting a code to omit, from marking consideration, a node location because such location comes with too high a cost in associated path length. Or, viewed another way, by permitting a code to include, for marking, a node location because such location can be marked with just a small cost in associated path length.

Figures 5, 6, 7:
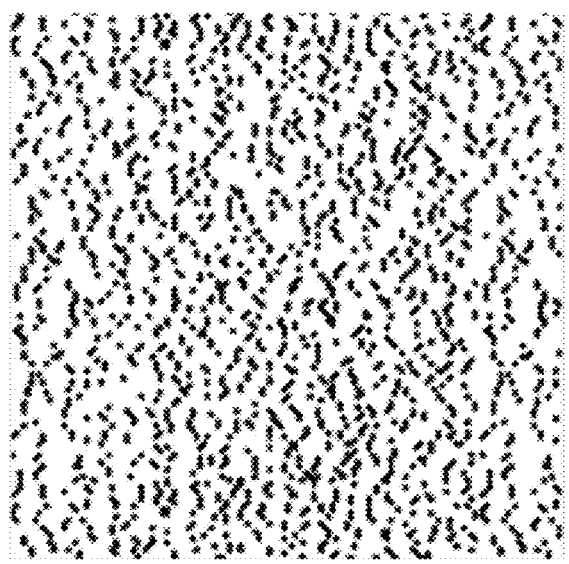

Consider the binary watermark pattern shown in FIG. 5. Close inspection reveals a predominantly vertical relationship between proximate dots. This is due to excluding, from marking consideration, waxel (node) locations where a horizontal distance of a connection path would exceed the vertical distance.

The logic here is that the two laser positioning mirrors redirect the laser beam at equal speeds in the vertical and horizontal directions. The time interval required to move 0.1 inch vertically is the same as the time interval required to move diagonally 0.141 inches—moving both vertically and horizontally 0.1 inch. The extra 0.041 inches is achieved "free" of time cost. If every movement between successive marking locations has a horizontal distance that is less than or equal to the vertical distance, then the horizontal movement comes for free. Each successive mark location can be reached in the time required for the vertical movement alone.

The FIG. 5 pattern is achieved by dividing the block into 24 elongated, vertical, swaths, each of 5 or 6 waxels in width. In each, candidate marking locations are identified (by one of the foregoing algorithms, e.g., Type 2). Then each candidate location is tested against horizontal displacement criteria. For example, is a path from the preceding location not longer horizontally than vertically? And is a path from the location, to the following location, not longer horizontally than vertically? Only if both tests are met is a candidate location marked in the illustrated embodiment.

An example will clarify. Consider FIG. 6, which shows an excerpt from a 128×128 array of continuous-tone watermark values (on a 0-255 scale). Waxel values are shown only for those locations having a value below 128 (i.e., the candidate, darker locations). The darkest of these locations would normally be marked (or at least a candidate for marking—depending on payload).

Waxels are considered in lanes, or swaths. In this example, the left half of the excerpt comprises a single swath; locations on the right side are in the next swath, and are not here considered for marking.

The process begins by picking the location with the lowest value (darkest) among the locations in the swath. This is the bolded location in FIG. 7, of value 15. This location will be on the laser marking path and marked.

The process continues by examining the next-darkest location, which in this case has the value 21. It then tests this location by two criteria. Is it no further horizontally, than vertically, from the next-above selected location (if any has been selected)? This location is 2 waxels to the right, and 5 waxels down, from the next-above selected location (i.e., the location of value 15), so this criterion is met. The second test is whether such location is no further horizontally, than vertically, from the next-below selected location (if any has been selected)? In this case no location has been selected below, so this test is passed too. Thus, this second waxel is added to the laser marking path, as shown by the bolding in FIG. 8.

The next-darkest location is then considered—here having a value of 22. It passes both tests: it is 3 below the selected waxel above, while being only 2 to the right; and it is 2 above the selected waxel below, while at no horizontal distance. Thus, this third waxel is added to the laser marking path, as shown by the bolding in FIG. 9.

Figures 8, 9, 10:
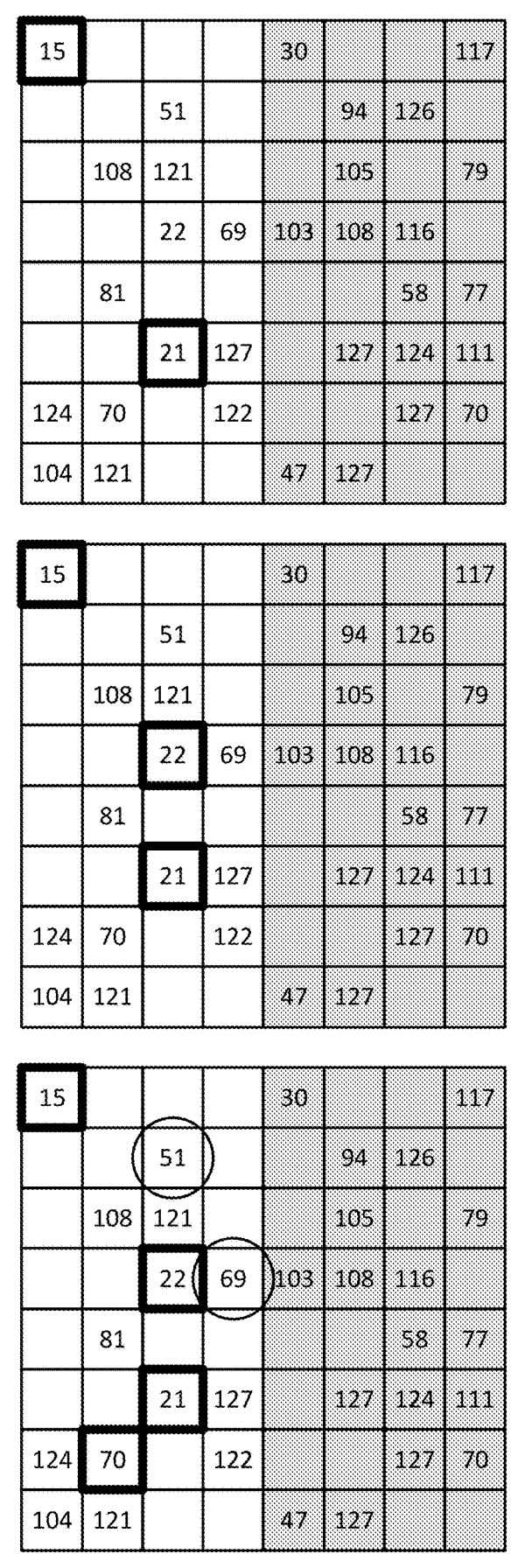

Turning to FIG. 10, the next-darkest location in the continuous-tone watermark block within the swath has a value of 51 (denoted by a circle). It is displaced by 1 waxel vertically, but 2 waxels horizontally, from the marked waxel next-above. This location is thus disqualified from marking. It is omitted from the laser marking path.

The next-darkest location has a value of 69 (also denoted by a circle). It is displaced by zero waxels vertically and by one waxel horizontally from the adjoining selected waxel. That adjoining waxel would either immediately precede or follow this location (of value 69) on a laser marking path, but violates the test (1>0). Thus, this location is also disqualified from marking.

The next-darkest location has a value of 70. This meets the test. It is equidistant both vertically and horizontally from the marked location above it, and no marked location is below it. So this location is added to the laser marking path (as shown by its bolding in FIG. 10).

Figure 11:
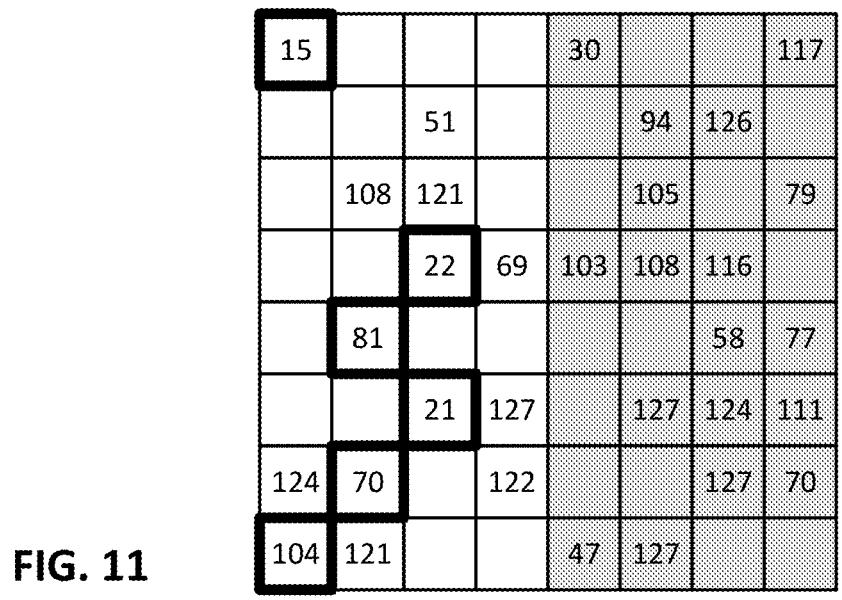

The process continues a few more steps in FIG. 11. The next-darkest location has a value of 81. It is equidistant vertically and horizontally from the marked locations above and below, so qualifies for marking. The next-darkest location then has a value of 104. It is equidistant vertically and horizontally from the marked location above, and there is no marked location below, so it too qualifies for marking.

This process continues—selecting locations for marking until a darkness criterion is achieved. The darkness criterion can take various forms. For example, the criterion can be to keep marking locations until the count of marked locations in a swath reaches a count limit, such as 10. Or the criterion can be to keep marking locations until the darkness value of the lightest marked location reaches a value limit, such as 104. Such criterion can be established for each swath, or for the entire block.

The resulting selection of locations chosen for marking have a predominantly vertical structure, permitting etching by a laser path in which no time is consumed due to horizontal movement (except between swaths). All horizontal movements between successive marking locations are free due to concurrent vertical movements. The laser path goes vertically down one swath making marks, then moves horizontally to the next swath and returns vertically while also making marks. The path continues in such roughly-raster fashion until all swaths have been marked.

In such embodiment the average path between successive marks is longer vertically than horizontally. In one particular embodiment, with a dot density of 20, the vertical component of the average path length is about 150% that of the horizontal component. As the dot density is increased, this number drops, but still typically exceeds 125% or 130%. As the dot density is decreased, this number rises—sometimes with the vertical component of the average path length exceeding 200% of the horizontal component.

By essentially spending no time moving the laser head horizontally except between swaths (since all intra-swath horizontal movements are "free"), a shortening of path length and an increase in etching speed are increased—by about 12% in the example shown in FIG. 5. (The total path length between all the marks in a swath will only slightly exceed the length of the swath. The time to traverse and print all the marks in the block will essentially be equal to the time that would be required to print the same number of marks in a straight scan across the block.)

It will be recognized that the binary watermark pattern resulting from such approach is sub-optimal in the sense that it selects, for marking, some locations that are inferior to other, superior (lower-valued) locations that are left un-marked. In FIG. 11, for example, locations having values of 70 and 104 are marked, while locations having values of 51 and 69 (circled in FIG. 10) are left un-marked. Such selection of these relatively inferior locations, rather than these relatively superior locations, yields a 2D code that less faithfully approximates the ideal code pattern (i.e., the continuous-tone watermark pattern). However, robustness of decoding (e.g., in the presence of additive noise) only suffers about 5% in the FIG. 5 example, which is more than merited by the 12% speed-up in etching due to shorter path length.

While the FIG. 5 example involves 24 swaths, other swath counts can naturally be used. Typical swath values, for a 128×128 block, range between 15 and 30 (i.e. with swaths of about 4-9 waxels in width), and most commonly fall between 20 and 28 (swaths of about 5-6 waxels in width). The swaths can be of different widths, but preferably are close to each other in width.

Figure 12:
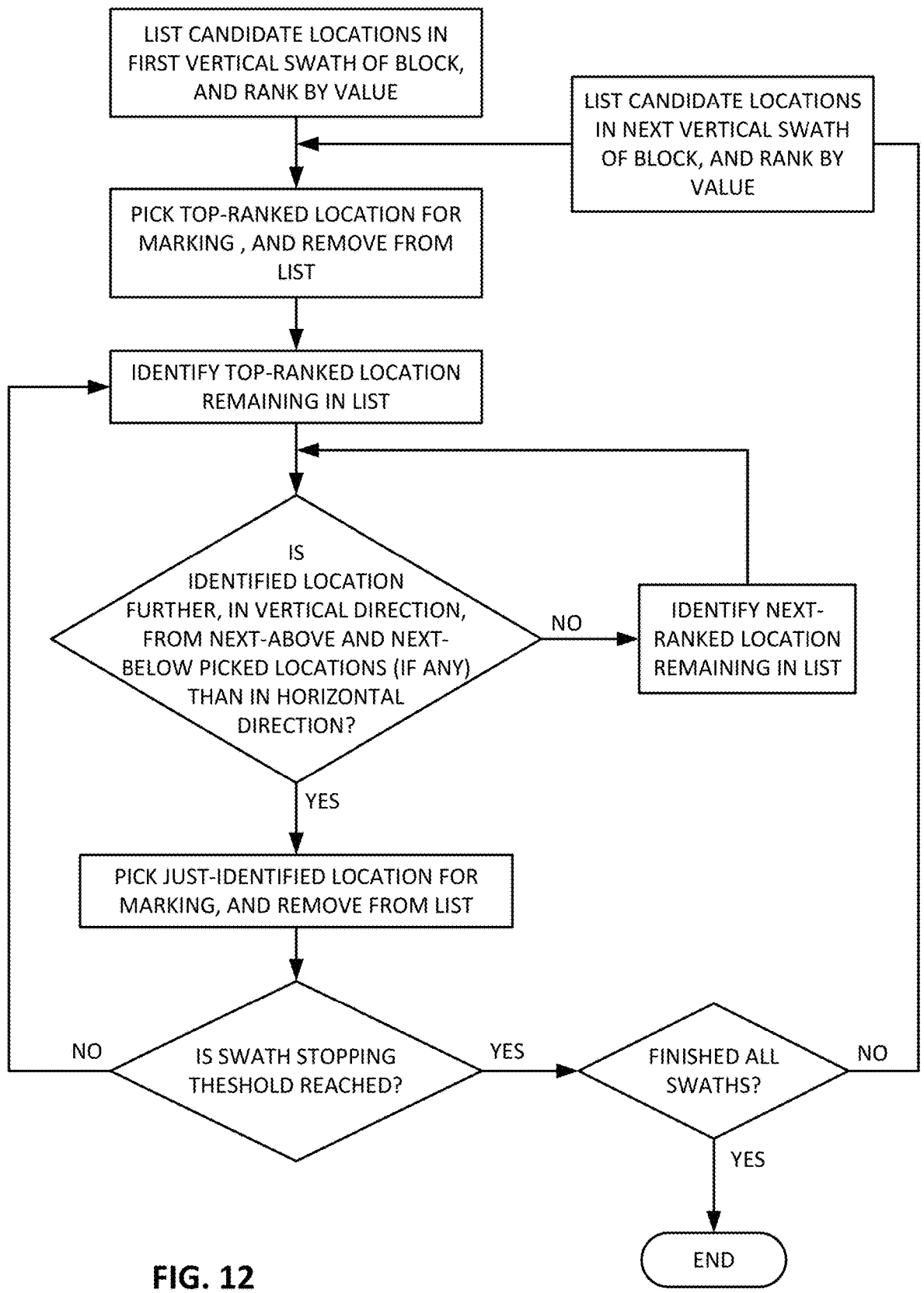
FIG. 12 is a flowchart for a swath-based mark selection algorithm.

FIG. 12 is a flow chart showing aspects of the above-described swath-based mark selection algorithm.

It will be recognized that, in the just-detailed arrangement, no row within a single swath can have more than one mark.

Naturally, the detailed algorithm is subject to multiple variations. For example, instead of processing each swath separately, the watermark block can be processed as a whole. In such case the horizontal/vertical test for a candidate location would compare to above/below locations within that same swath. In another variation the algorithm may permit some exceptions to the stated criteria. For example, the algorithm may permit marking of a candidate location that horizontally adjoins a previously-selected mark—despite being one waxel further horizontally than vertically (as is the case with the waxel of value 69 in FIG. 10). Many such variations preserve the attribute of average vertical displacement significantly exceeding average horizontal displacement (e.g., by 25% of more), which yields the desired shortening of laser etching path length.

Marking in vertical swaths helps, too, with the curvature of a bottle. If a bottle is oriented vertically, and the laser optics focus the beam at {x,y} points falling within a common plane, then the curvature makes some locations on the surface closer or further from this plane. An exemplary marking system may have a usable depth of field on the order of 5 mm. Depending on the radius of the bottle and the horizontal span of the watermark pattern, some locations may fall outside the markable range—requiring movement of the bottle or the marking apparatus. Executing the marking in vertical swaths facilitates such necessary movements.

Figure 13:
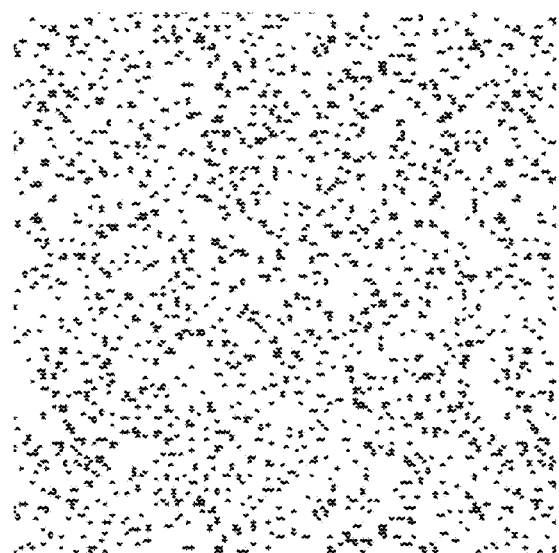
FIG. 13 shows a binary watermark pattern in which marks have been selected to promote clustering, to speed etching.
Figure 14:
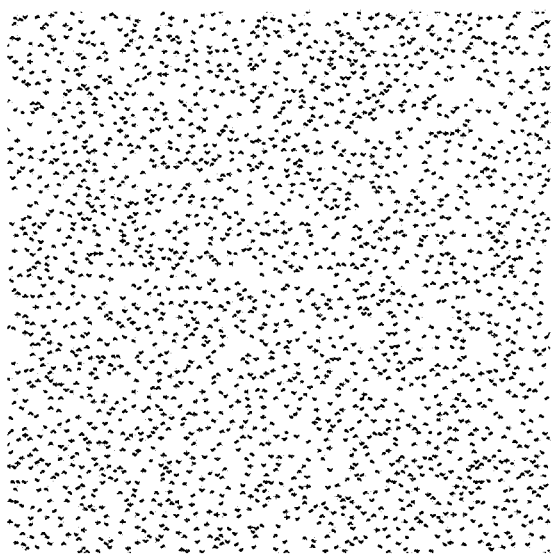
FIG. 14 shows a binary watermark pattern like FIG. 13, but without clustering.

A different embodiment is shown in FIG. 13. Here the marks are selected to form clusters, which again yields a sub-optimal 2D code, but again in so-doing shortens the laser etching path length. FIG. 14 shows a pattern of the same dot density but without clustering, for comparison. Of the two patterns, the pattern of FIG. 14 more faithfully approximates the continuous-tone watermark pattern from which both FIGS. 13 and 14 are derived. (Both patterns are derived from the same continuous-tone watermark pattern using principles of the Type 2 method described above).

There are many procedures by which locations may be selected to form clusters. An exemplary procedure is illustrated with the watermark excerpt shown in FIG. 15. As before, the indicated numbers are greyscale values of a corresponding continuous-tone watermark signal, with values of 128-255 omitted (since such light pattern locations are desirably left unmarked).

The detailed algorithm employs two tables, shown in FIG. 16. The first, left table contains a list of candidate waxel locations for which all eight neighboring locations are unmarked. Each such waxel is identified by rank, value and location (specified in {row,column} coordinates). The second, right, table identifies candidate waxels having one or more neighbors that are already marked. Waxels are preferentially chosen from the right table to foster clustering. The manner of this preference is detailed below.

Initially the left table in FIG. 16 is fully-populated, listing all candidate waxels in ranked order, because no marked locations have been selected. For the same reason, the right table is initially empty.

The algorithm begins by picking, for marking, the darkest waxel location. This is the top-ranked waxel in the left table, which has value 22 and is found at coordinates {4,3}. This location is marked in an output block—shown by cross-hatching in FIG. 17. Referring back to FIG. 15 it can be seen that three candidate waxels (having values of 108, 121 and 69) are among this waxel's eight neighbors. These three waxels are added to the right table, and removed from the left table. As a visual clue to aid explanation (but not as a part of the algorithm), these three neighboring locations are denoted, in FIG. 17, by a dashed line across their corners.

Normally, the second waxel selected for marking would be the second darkest waxel, i.e., the waxel of rank 2 in the left table. That waxel is seen to have a value of 30. However, if a candidate waxel that neighbors the existing mark (at location {4,3}) has a competitive value, then it may be marked instead as the second choice—contributing to clustering. (Competitiveness is elaborated below.)

Figures 15, 17:
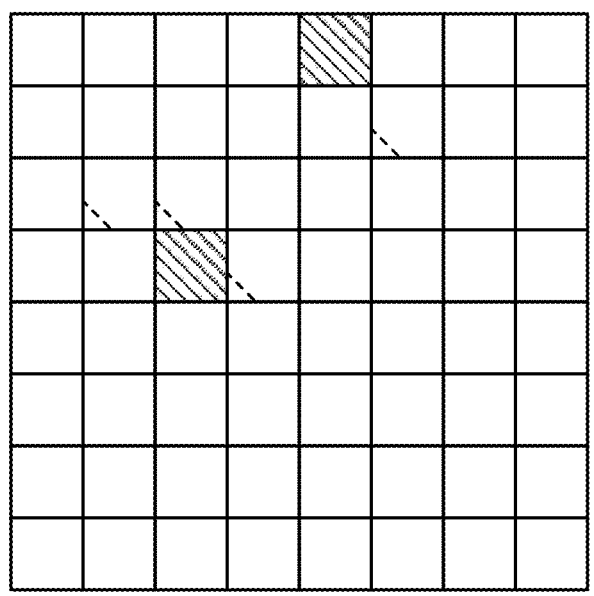

As noted and shown in FIG. 15, the values of the three candidate waxels adjoining the selected waxel (at location {4,3}) have values of 108, 121 and 69. 69 is the darkest of these neighboring waxels, but its darkness isn't really close-enough to that of the second-ranked waxel (which has value 30) to be competitive with it. So the algorithm selects the darker waxel of value 30 for marking. Again, this is shown by cross-hatching in FIG. 17. Again, its neighboring locations are examined for values below 128 (i.e., waxels that are candidates for marking), and they are denoted by the corner dashed line. There is just one such location in this instance.

After each selection of a waxel for marking, the two tables are updated. FIG. 18 shows the state of the tables after the first two waxels have been selected for marking. The first two rows have been removed from both tables, as these two waxels are no longer candidates for marking (they have already been selected for marking). Four rows have been removed from the left table. These identify the waxels denoted by dashed corner lines in FIG. 17, which adjoin now-marked waxels. The right table identifies the four waxels just-deleted from the left table. Each of these waxels identified in the right table adjoins a now-marked waxel.

To pick a third waxel for marking we see, from FIG. 18, that the currently top-ranked candidate waxel has a value of 47. We examine the right table to identify the darkest waxel that neighbors a previously-marked waxel, and find it has a value of 69. We decide a value of 69 isn't competitive with a value of 47, so we mark the waxel of value 47 (at coordinates {8,5}). We update the tables accordingly. We remove this waxel of value 47 from all tables, as it is no longer a candidate waxel. We identify the candidate waxels that neighbor the just-marked waxel, and remove them from the left table and add them to the right table. (There are two such neighboring candidate waxels, shown by dashed corner lines in FIG. 19—one of value 122 and one of value 127.)

Figure 19:
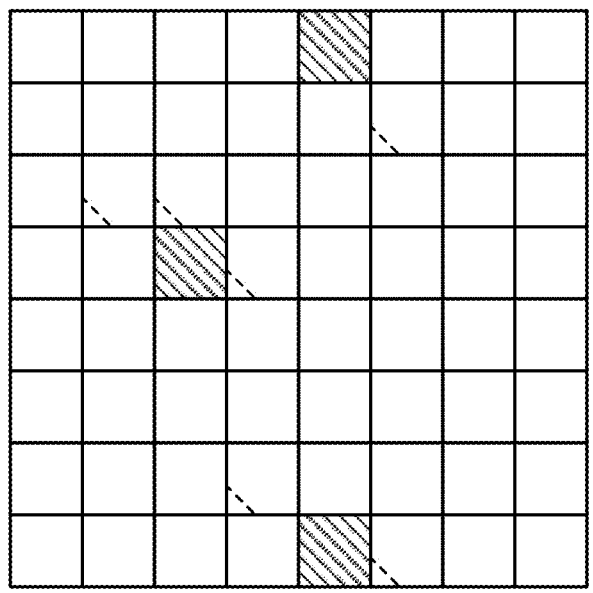

FIGS. 19 and 20 show the current state of affairs. Three waxels are marked in the output block of FIG. 19. Six waxels neighboring these marked waxels are identified in the right table of FIG. 20. The three top-ranked waxels are omitted from both tables.

Figure 21:
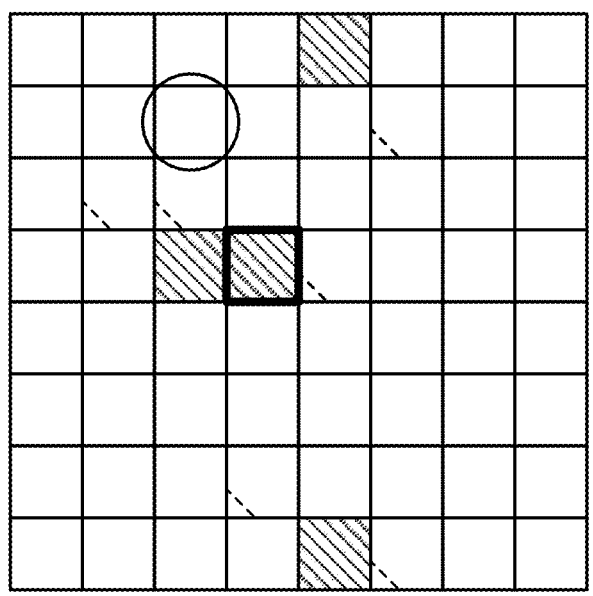

To pick a fourth waxel for marking we consider the top-ranked candidate in the left table. This is now the waxel of value 51. We look in the right table to find the darkest candidate waxel that neighbors a previously-marked waxel. We find it has a value of 69. In this case we decide the 69 is competitive with 51. We decide to select the waxel of value 69, in preference to the waxel of value 51, in order to promote clustering of the selected marks. So as shown in FIG. 21 we select the waxel of value 69 for the fourth mark, and not the waxel of value 51 (shown circled).

The criterion for competitiveness can be a simple numeric proximity. For example, if the top-ranked waxel in the right table has a value within 20 of the top-ranked waxel in the left table, then the waxel from the right table is picked instead. This value of 20 thus serves as a bias that inclines the algorithm to favor clustering over darkness alone (yet darkness plays a role too). The value, 20, can be set based on the degree of clustering desired. The greater the value, the greater the bias in favor of clustering, and the more clustered the marks in the resulting binary watermark pattern.

This bias causes the sub-optimality. That is, it causes the algorithm to pick a relatively inferior location for one or more marks, instead of a relatively superior location, in order to reduce the laser path length.

Criteria different than a simple numeric proximity, like 20, can be employed. A percentage can be employed. For instance, the top-ranked waxel in the right table is preferentially picked over the top-ranked waxel in the left table if the former has a value less than 125% of the latter. Or row position in the tables can be employed. For example, the top-ranked waxel in the right table is picked if it is located within N rows of the top-ranked waxel in the left table. For a 128×128 waxel block, N may be on the order of 50 or 500. In the former case, about the last 50 waxels chosen for marking are waxels that would otherwise not be dark enough to be selected. Yet they are judged, by this criterion, to be competitive. And the selection of each places a mark next to an already-existing mark, promoting clustering.

Other criteria will be evident to the artisan; the foregoing are just a simple sampling chosen for expository convenience. In practice, more complex criteria can be employed—sometimes involving multiple factors (e.g., within numeric proximity of 12 AND within the next 100 table rows). In some instances factors are combined in weighted, possibly exponential fashion to generate a polynomial score relating the top-ranked waxel in the right table to that in the left table. The resulting score then determines which of the two waxels is selected for marking.

Continuing with the former example, after marking the output signal block with the fourth-chosen mark, the tables are updated, e.g., indicating that a candidate waxel of value 103 neighbors the just-selected waxel location. The just-selected waxel of value 69 is removed from the right table as it is no longer a candidate for selection, while the un-selected value of 51 remains in the left table. The tables of FIG. 22 result.

Figure 23:
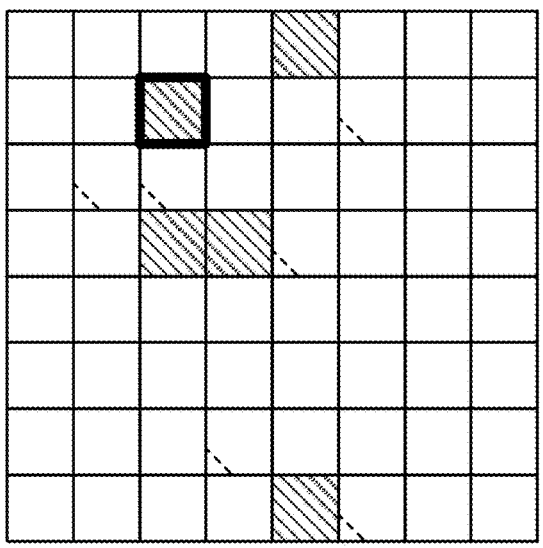

Selection of a fifth mark location proceeds using the tables of FIG. 22. The top-ranked waxel in the left table still has a value of 51. The top-ranked waxel in the right table now has a value of 94. This latter value does not meet the competitiveness criteria (numeric proximity within 20), so the waxel in the left table is marked, as shown in bold in FIG. 23. The tables are again updated accordingly.

The algorithm continues in this fashion until a darkness (stopping) criterion is met, such as a count of marked waxels (e.g., 1500 in an illustrative embodiment). Again, the resulting binary watermark pattern is sub-optimal in the sense that locations were passed-over for marking due to selection of different locations—of inferior value (i.e., of lighter greyscale) —in order to shorten the laser etching path length, here by clustering. In the example of FIG. 13, the path length is reduced by on the order of 8% due to clustering, compared to the optimal tile of FIG. 14. This benefit comes at a cost of only about a 2% reduction in robustness—again a favorable tradeoff.

The degree of clustering within a binary watermark pattern block can be defined by a clustering metric, which may be defined in various ways. One is to determine—for each mark location in the block—the distance to the closest other mark, and then square this distance. Such squared distances are averaged across all marks in the block. The smaller the metric, the more tightly-clustered are the marks. When such metric is computed both for a clustered block (such as FIG. 13) and a regular block having the same size and the same number of marks (such as FIG. 14), the metric of the clustered block will typically be less than 75% (and will commonly be less than 66% or 50%) of the metric for the regular block.

Still another approach to speeding the marking process is not to slow the laser speed by a factor of three for marking, compared to inter-mark moving. Use of a slower speed for marking is conventional wisdom due to enhanced positioning accuracy. But applicant has found that positioning inaccuracy due to high speed marking does not meaningfully impair robustness of applicant's detailed binary watermark patterns.

In a preferred embodiment, the speed used for moving is also used for marking (e.g., 15 meters/second in the illustrative system). But substantial gains in marking speed can be achieved by simply slowing the laser less than the norm for marking, e.g., slowing it to 40%, 55% or 75% of the moving speed, instead of to the conventional 33.3% figure. Double-digit percentage gains in etching speed can thereby be achieved.

Another technique to achieve double-digit percentage gains in etching speed is to reduce the number of marks. For example, instead of marking a bottle at a dot density of 20 (about 1640 marks in a square inch indicia), the dot density can be reduced to 14 (about 1150 marks in a square inch indicia). Reduction of the number of marks by 30% yields a near-commensurate reduction in path length, with a corresponding increase in etching speed.

Normally, reducing the number of marks reduces the decoding robustness for the indicia. But applicant has found a way to counteract this drop in robustness: by making the marks larger. For example, instead of measuring 0.5×1.0 waxels, the marks can be made to measure 0.5×1.5 waxels, or 0.5×2 waxels.

Figure 24:
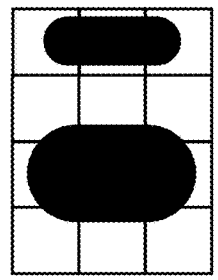
FIG. 24 shows marks of different sizes, presented on an array of watermark element cells.

It is counter-intuitive to use a mark that exceeds, in any dimension, the width of a waxel. By use of a dimension larger than 1.0 waxels, the mark extends into territory of one or more adjoining neighbors. (Such a mark extends into territory of two neighbors if the mark is centered on the subject waxel node and is less than one waxel in the other dimension. It extends into territory of four or eight, or more, neighbors if the mark is also more than one waxel in the second dimension. See FIG. 24, which shows two marks on a grid of waxel locations.) Most commonly the binary watermark pattern would leave neighboring waxels unmarked. So the intrusion commonly effects a degradation in the intended pattern.

Figure 25:
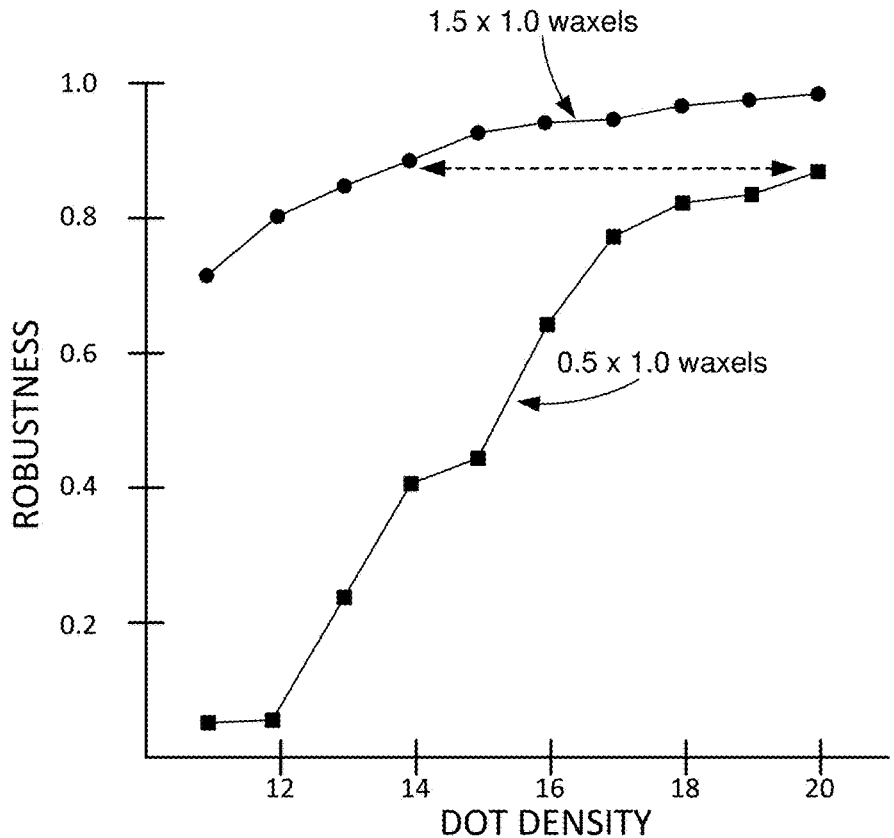
FIG. 25 is a graph detailing robustness of binary watermark patterns formed with differently-sized marks, as a function of dot density.

Surprisingly, applicant has found that more may be gained than lost by such degradation. Results of one study are shown in FIG. 25. The vertical axis indicates a robustness measure (indicating decoding reliability in the presence of added noise). The horizontal axis shows different dot density experiments. Two curves are shown, one for marks that are 1.5×1.0 waxels in size, and one for marks that are 0.5×1.5 waxels in size. As indicated by the dashed horizontal line, the larger marks exhibit a robustness at a dot density of 14 matching that of the smaller marks at a dot density of 20. (The corresponding curve for marks that are 2.0×1.0 waxels in size is only barely above that of the 1.5×1.0 waxels curve. At still larger dimensions the situation reverses and robustness diminishes with larger marks.)

Thus, another aspect of the present technology is a binary watermark pattern in which the marks have a long dimension (and in some instances also a short dimension) that is 125% or more of a waxel width, e.g., 150% or 200%. By such approach, fewer marks can be used—with an attendant reduction in etching path length and an increase in etching path speed—while impairing robustness slightly or not at all.

Figure 26:
FIG. 26 shows an elliptical laser illumination spot.

Marks can be made longer by activating the laser for longer marking intervals during its transit. Alternatively, and sometimes preferable (e.g., if the laser speed is slowed during marking) is to use laser optics that form a broader mark (e.g., 1.5 waxels). One dimension of each mark can thus be defined by the interval of laser activation, while the other dimension can be established by the optics. One or both can be larger than a waxel, such as 1.0, 1.5, or 2.0 waxels. (Such embodiment may employ optics that elongate the illuminated area, so that a mark of length shorter than breadth can be achieved, such as shown in the elliptical illumination profile of FIG. 26. Enlarging the illuminated area may also require use of more laser power, or a different laser wavelength, to effect the same degree of surface change at a given rate of etching speed.)

Just as linear scanning can be used to etch a one inch square patch on a bottle, it can also be used to etch the entire cylindrical side of a bottle. In such arrangement the bottle is slowly rotated on a turntable (e.g., around a vertical axis), and a laser is mirror-steered down the side of the bottle and turned on/off to etch a desired series of marks, in a single column. The beam is then steered back to the top of the bottle, while making a second column of marks. This process repeats until the entire cylindrical surface has been processed.

The reciprocating motion of the mirror requires it to stop and change direction at the end of every line of marks. A different arrangement avoids this repeated fight against momentum.

This different arrangement involves rotating the bottle. If the entire cylindrical surface of a bottle is to be etched with a pattern—or even only a circumferential band is to be etched—the bottle can be spun continuously (e.g., around a vertical axis), while the laser writes a circumferential band of marks. At the end of one rotation the laser is stepped to the next circumferential band, and the process repeats. Each rotation of the bottle yields a new band of marks. The high energy movement is of the bottle itself, but this movement is continuous; momentum is a help instead of a hindrance.

Synchronization of the linear mirror movement to the rotation movement can be simply accomplished, e.g., by a microswitch that is closed, once per rotation cycle, by a cam on the shaft of the turntable motor. Each closure of this switch can trigger a stepper positioner that advances the laser mirror by a one waxel increment.

In a variant arrangement, more than one ring of marks is etched per resolution. By using multiple lasers, or a digital light projector (DLP) chip to scatter light from a single laser (as further detailed below), multiple different rings of marks (e.g., a swath 0.5, 1 or 2 inches in vertical extent) can be formed per bottle rotation. The marking mirror arrangement can then be stepped to the next band of rings to be marked.

In still another arrangement a mirror slowly, continuously steers the laser beam down the bottle during rotation, at a rate of one waxel in vertical movement per rotation. A helical track of waxels results—spanning the bottle. Again, the mirror does not reciprocate at any point during marking of the entire surface. (Movement of the mirror can again be slaved to the rotation motor, e.g., by a screw drive arrangement that turns in synchrony with the turntable motor, and causes the mirror to linearly advance down the screw drive shaft.)

In arrangements such as just-described, the watermark block is desirably sized to be an integral fraction of the bottle circumference, so that an integer number of watermark blocks spans the bottle.

If a circumferential marking is not required—but just a single patch (e.g., of one inch square) —then high speed rotation of the bottle gains little. Most of the time spent in rotation would be wasted, since the laser is used only for a small fraction of each rotation.

Figure 27A:
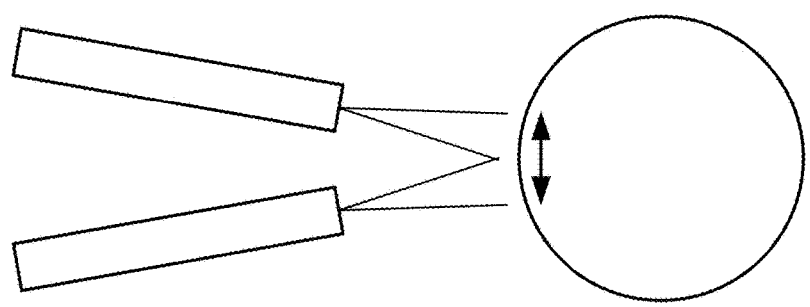
FIGS. 27A and 27B show aspects of a marking apparatus that employs two independently-controlled laser beams, which cooperate to simultaneously etch two parts of a single 2D machine-readable code.
Figure 27B:
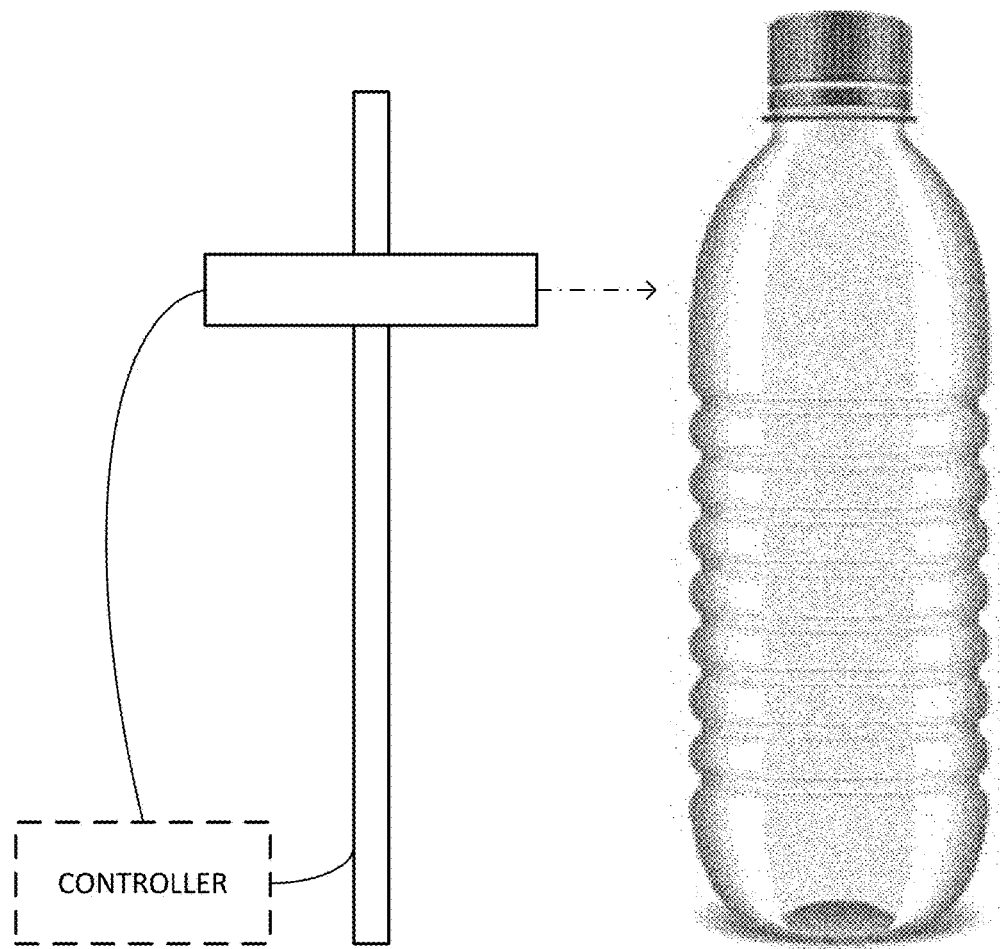

Another approach to speeding etching is to simultaneously yet independently etch multiple regions of a binary watermark block, e.g., with two or more different lasers. FIGS. 27A and 27B show top and side schematic views of such an arrangement. The width of the patch to be etched is shown by the double-ended arrow in FIG. 27A. Two laser beams etch this area. Each may follow a raster pattern as described above, but more commonly each would employ one of the path-optimized approaches, e.g., a traveling salesman path applied to clustered marks, or marks in vertical swaths. One laser etches the left side of the pattern while the other etches the right side of the patch. In some embodiments the laser marking apparatus may be physically moved in a vertical direction (as opposed to simply mirror-steered) on a rail, as is known in the art, to etch regions beyond the steering range of the mirrors. (Here, as in all embodiments, a control unit issues commands to the laser, the mirrors, and/or any physical repositioning system to yield the desired etching pattern.) By dividing the patch into left and right halves, the focal distance variation over which the system must etch, due to bottle curvature, is reduced by more than a factor of two.

Figure 28:
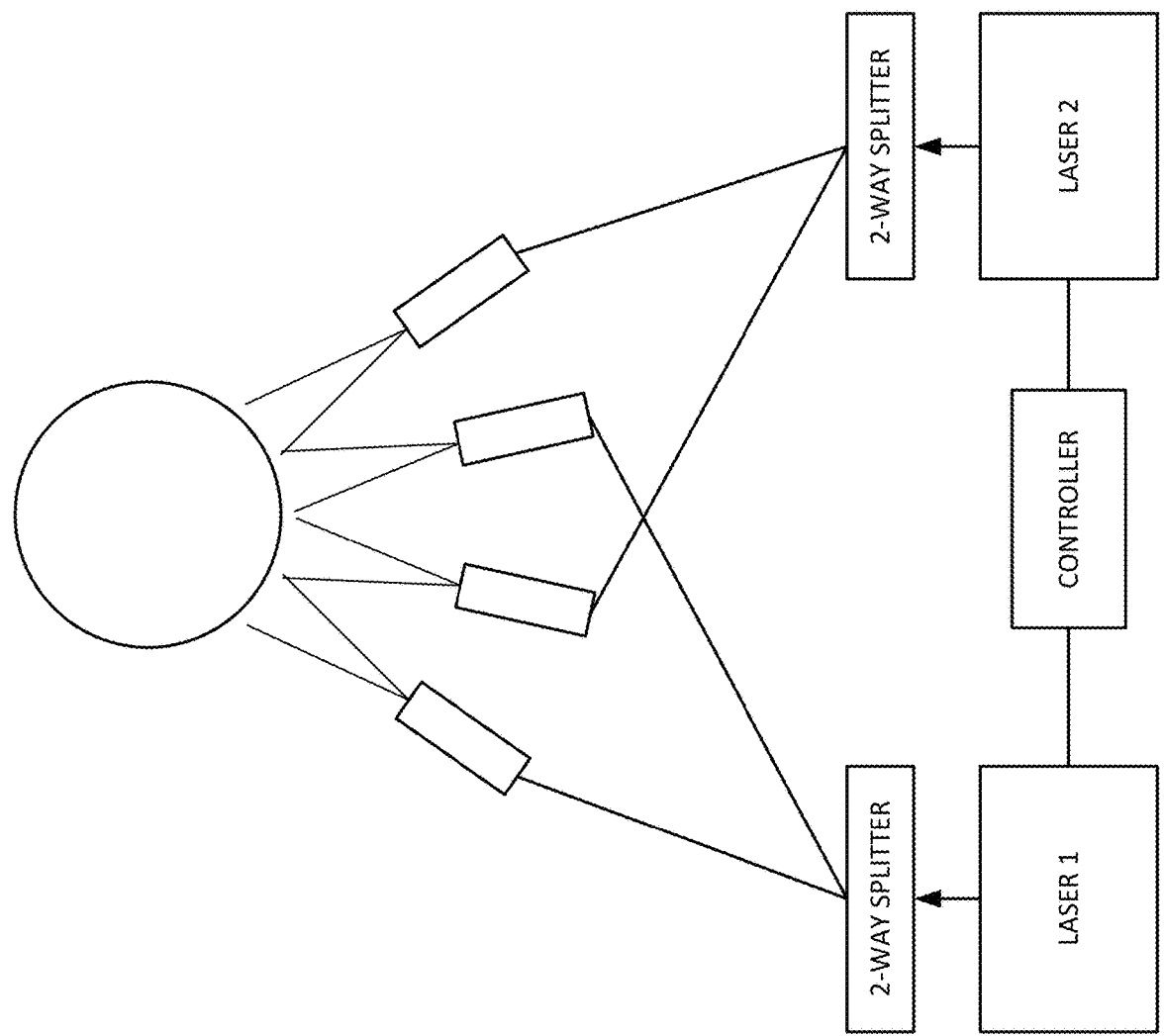
FIG. 28 illustrates that identical watermark patterns may be formed at multiple different locations on a bottle, through use of beam-splitting.

Often, watermark patterns are assembled in tiled arrangements, with blocks disposed edge-to-edge to cover a larger area. In such case one or more beam-splitters can be used to facilitate such etching. FIG. 28 shows one example. Two laser beams are used to form a watermark pattern, as in FIG. 27A. But the use of beam-splitters permits multiple such patterns to be etched on a bottle simultaneously. One laser etches the left side of each watermark block formed on the bottle while a second laser etches the right side of each watermark block.

Figure 29:
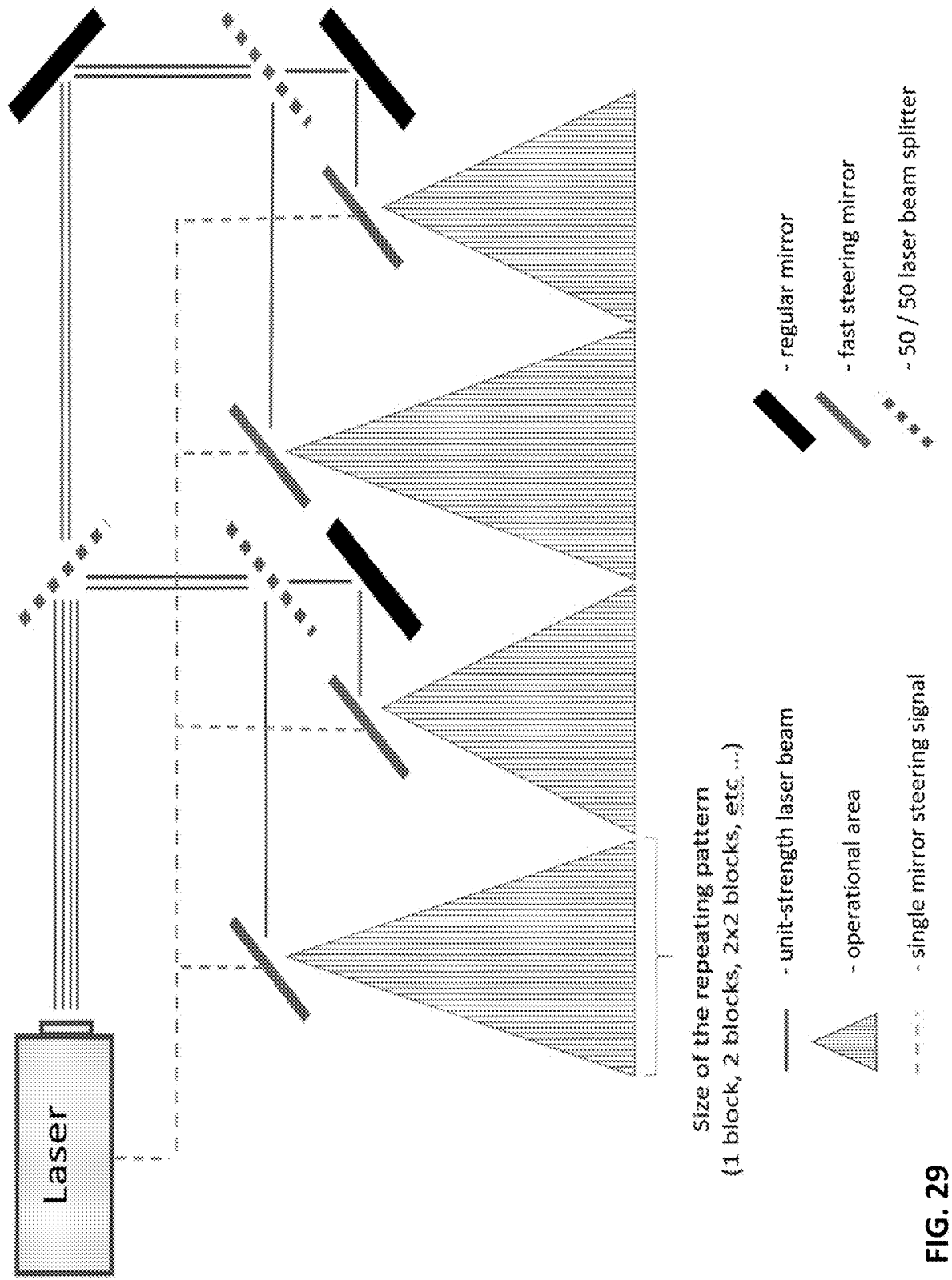
FIG. 29 shows another arrangement for forming identical patterns at multiple different locations on a bottle—this one using a single laser, and a single mirror per pattern.

FIG. 29 shows another example—this one employing a single laser beam, and a single mirror for each of the four patterns to be simultaneously-etched on the workpiece. (Each pattern may be a single binary watermark block, or two such blocks side by side, or a 2×2 array of blocks, etc.) The steering mirror for each pattern may move about just a single axis; movement in a perpendicular axis can be achieved by rotating the bottle.

Figure 30:
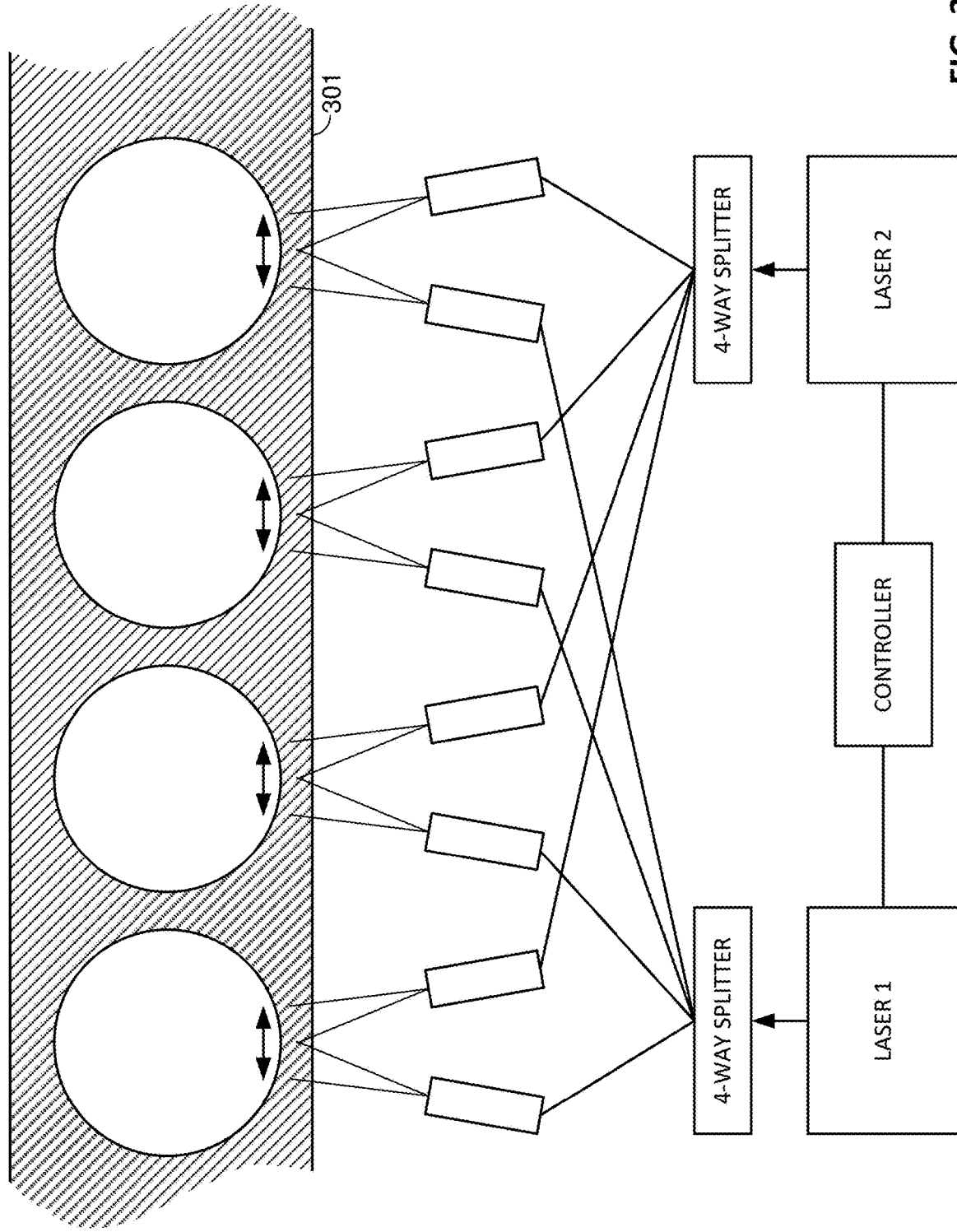
FIG. 30 shows an arrangement for marking multiple bottles simultaneously using a plurality of lasers.

Sometimes plural bottles may need to be marked with the same binary watermark pattern, yet production volume doesn't warrant creation of a correspondingly-customized metal mold. In such case a beam-splitting arrangement can be used to simultaneously etch multiple bottles with the same pattern. An exemplary system, for etching four bottles, is shown in FIG. 30. The bottles are moved into place on a conveyor 301. First and second lasers are switched on and off to form marks for the left and right sides of each etched patch as in FIGS. 27A and 27B, while beam splitters and x/y mirrors steer the beams to appropriate locations on each surface. (In some embodiments a first single mirror steers the first laser's horizontal beam position on all four bottles, while a second single mirror steers this beam's vertical position on all four bottles. Two further mirrors similarly do all the steering for the second laser. In other arrangements, each bottle is etched using two pairs of dedicated mirrors—one directing illumination from the first laser and one directing illumination from the second laser.)

Multiple variations on such arrangements are possible. Each bottle may be etched with a single beam, instead of two as shown. A conveyor may advance continuously or stepwise during etching. Bottles may be mounted on turntables, so that they can be turned—again continuously or stepwise—while etching. Beam splitters may be omitted in embodiments described as including same. Instead, each bottle can be etched by one (or multiple) lasers associated with that bottle position in a multi-bottle line-up. In some embodiments a pipelined etching approach is used, with some marking applied to a bottle at a first location along a conveyor system, and further marking applied to that bottle—by the same marking laser or a different one—after it progresses to a second location along the conveyor system, etc. In some instances a single mirror may steer beams from several lasers—each modulated independently—in in tandem, e.g., for writing marks along parallel rasters.

In still other embodiments, a single laser may etch two or more marks in a single binary watermark block, at the same time, using a beam-splitting arrangement. Indeed, a single laser may simultaneously etch all of the marks within a sub-block of a 128×128 array, such as within a 16×16 sub-block. (There may be between about 3 and 40 marks in each such sub-block.) In a further embodiment, all of the marks etched on a bottle may be created simultaneously by a single laser/beam-splitter arrangement.

Splitting a laser beam into a multitude of output beams can be performed by a diffractive beam splitter. See, e.g., the Wikipedia article entitled Diffractive Beam Splitter, attached to U.S. application 63/038,735, and U.S. Pat. No. 6,884,961, 20060054606, 20080132088 and 20150246415. Optical fibers can couple output beams from such beam splitter(s) to a plurality of fixed physical locations from which the output beams etch marks on the bottle.

Still another embodiment uses a digital light projection (DLP) mirror array to re-direct illumination from a laser to multiple positions on a workpiece—allowing simultaneous etching of all marks within a binary watermark block in a single exposure. A conveyor can position a bottle into an exposure zone, the laser is energized, the DLP array scatters the light into the desired watermark pattern, and the bottle is etched. When the marks have been adequately formed (e.g., foamed), the conveyor advances another bottle into position and the process repeats. The mirror pattern can be reconfigured between exposures to effect serialization, if desired.

A suitable DLP array is the DLP650LNIR, which has 1280×800 resolution, an optical power-handling capability of 500 watts per square centimeter, and optics suited for switching light from a 10.6 μm carbon dioxide laser. Such DLP can be controlled by the companion DLPC410 controller chip. Both devices are available from Texas Instruments.

Such DLPs can also be used in the embodiments previously-discussed.

Further Arrangements

As is familiar, nothing in electronics happens "instantly" due to factors such as capacitance and inductance in the circuitry, which produce time delays before a system reaches a steady state following a change. Laser diodes consequently don't respond to control signals instantly. Even the fastest laser takes a finite interval of time to switch fully on, and off. As a result, the output power from a switched laser is not a perfect square wave, but rather ramps-up in power following the leading edge of an excitation pulse, and ramps-down in power following the trailing edge.

Many laser markers address such phenomena by permitting the laser positioning mechanism (e.g., mirrors) to settle into position for an instant before an excitation pulse is applied. A pulse is then applied, with both the ramping-up illumination and the main pulsed illumination being applied to the same physical target location. At the end of the excitation pulse, a further delay interval allows the laser illumination to decay while aimed at the same spot, before moving. A crisp dot is thereby etched into the target substrate.

These waiting intervals at the leading and trailing edges of the driving pulse extend the time needed to etch a substrate with a signal-carrying pattern. If hundreds or thousands of marks are to be placed in a small region (e.g., on the order of a square inch), the aggregate time of waiting (in the reposition-wait-mark-wait-reposition . . . sequence) can total more than 10% of the time needed to etch an area. In some instances the aggregate waiting intervals may exceed 33%, 50%, or even 75% of the total process time.

Figure 31:
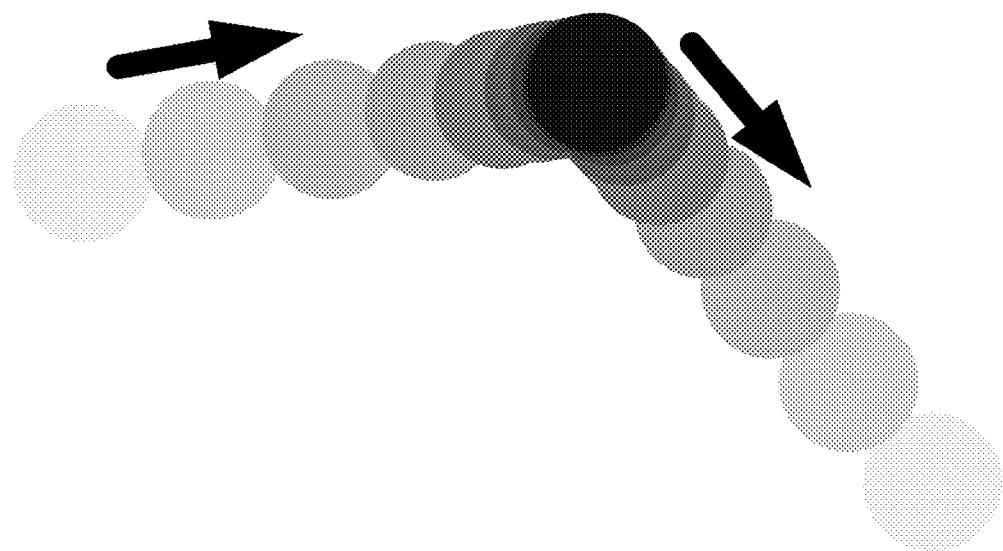
FIG. 31 illustrates the entry and exit tails that can be produced by the ramp-up and ramp-down intervals of laser operation.

In accordance with a further aspect of the present technology, the leading and/or trailing wait times are skipped. A laser activation signal is commenced before the laser has settled on the target location. A period of rising illumination follows while the laser is settling on its target position. This causes a varying profile of etching to be formed in the substrate. FIG. 31 illustrates the phenomenon schematically. Each circle represents an intensity and location of a laser pattern at a uniform sampling of illustrative time instants, from the moment activation of the laser first begins (with low output), until the moment the laser reaches full output (at its target location). The darkness of the circles represents different degrees of intensity.

In this instance the laser approaches the target location from the left, and pauses at the target location to etch a mark—shown by the darkest circle.

In like fashion, the laser can be moved from the target location before its illumination has dropped to zero. For example, the activation pulse can be switched off coincident with the start of laser movement. Radiation from the laser will taper-off in accordance with the time constant of the circuit as the laser moves away from the target location. This causes the laser to etch a path of diminishing intensity as it leaves the target location, in this example down and to the right.

The result is a mark with two tails—one tracing the laser's path moving to the target location, and one tracing the laser's path moving away from the target location. The tails diminish in intensity with distance from the target. Each mark can thus be considered as a "V," with a variable angle between the legs, depending on the difference between approach- and exit-directions for the laser beam.

Figure 32:
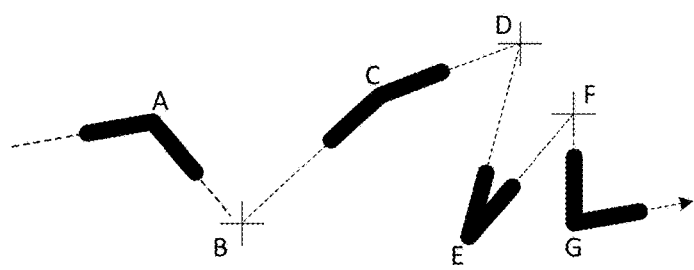
FIG. 32 shows a routing of a marking system to produce a series of four marks, each with two tails, thereby forming "V's."

These "V" marks can be regarded as elemental shapes that are assembled in a pattern, e.g., to mimic extrema within a continuous-tone watermark signal, or excerpt thereof. FIG. 32 illustrates the concept.

In such an arrangement the laser approaches a location "A," and activation begins before it has settled at that location. After etching at location "A," the laser is turned off and is moved towards a location "B." The "V" shape just-noted is thereby formed, with its apex at location "A," and tails along the entrance and exit paths. (The two line segments forming the "V" are shown as the same darkness and width in FIG. 32, although the intensity of the tail markings—and in some instances their widths—vary in accordance with the energy applied to the substrate during the ramping-up and ramping-down of laser illumination.)

The laser is directed to location "B" not to form a mark there, but rather to establish the direction of the exit tail—and to establish the direction of the entry tail for the next mark. The laser remains unenergized until the laser next steers towards and approaches location "C." Here, again, the laser is energized before settling on this target location, producing a ramp-up entry tail. A mark is burned at location "C" and the laser is moved towards location "D" while its output illumination ramps down in intensity.

Again, no mark is formed at location "D." Rather, it is simply a way-station on the way to the next marking location "E" where the process repeats. Location "D" is chosen to establish desired directions of the exit tail for the mark formed at "C" and the entry tail for the mark formed at "E."

The process continues in this fashion: visiting marking locations, and forming entry tails in the substrate as the laser ramps-up, followed by moving to intermediate locations, and forming exit tails as the laser ramps down.

Such arrangement can be employed in any of the embodiments earlier-discussed. For example, if the entire sidewall of a bottle is to be marked, swaths of a quarter or half inch, or more, can be vertically etched along the sidewall, alternating between a top-to-down swath and an adjoining bottom-to-top swath, as discussed in connection with FIGS. 27A and 27B. Alternatively, a swath of a quarter or half inch, or more, can be formed in ring fashion around a circumference of a bottle, as the bottle rotates, followed by other, adjoining, swaths.

(FIG. 32 is greatly simplified for sake of clarity. A quarter inch swath of a block that is an inch on a side may have on the order of between 50 and a thousand marking locations. But the four "V" markings in FIG. 32 convey the principle.)

There are various methods by which a continuous-tone watermark signal can be modeled using the "V"s as just-described. One is to establish a 2D intensity template of a "V" pattern, with greatest intensity at the apex of the "V"," and with intensity diminishing out the tails. (The two tails may have different intensity profiles, depending on the ramp-up and ramp-down laser output.) The size of the pattern will depend on the laser beam width (for the size of the apex mark), the speed of laser travel, and the time constants of the laser turn-on/turn-off. The template may correspond to a 2D area on the order of 2-10 waxels on a side. Multiple such templates can be formed—each for a different "V" angle (e.g., in five- or ten-degree steps from 0 to 180 degrees), and for a different orientation (e.g., every 15 degrees between 0 and 345 degrees). Excerpts of local extrema in the continuous-tone watermark pattern, of the same size, are then extracted from the pattern. For each such excerpt, correlation operations are performed to identify which of these template "V" patterns yields the best correlation. The "V" pattern that best corresponds to the local pattern excerpt is then added to an output signal block at a location corresponding to that excerpt. An output block is thereby assembled of "V"s selected to mimic the continuous-tone signal.

Another method again extracts an excerpt around each extremum location in the continuous-tone watermark. The excerpt can be square in shape, 2-10 waxels on a side, centered on the extremum. Each such excerpt is then processed to find a dominant and secondary orientation (i.e., primary and secondary "ridges" of the extremum). This can be done by sampling the continuous-tone signal at a dozen or more uniformly-spaced locations on a circle centered in this excerpt. The most extreme value on this circle (e.g., the lowest value) is then found. The line between the center and this most extreme peripheral sample location defines the dominant orientation of the extremum. To find a secondary orientation, the process is repeated—looking for a sample point on the circle with the next-most-extreme value. (In some embodiments, sample points within one or two samples of the just-determined most-extreme value are disregarded.) The line between the center and this next-most extreme value defines the secondary orientation of the extremum. A "V" is then used to model this extremum, with the apex located at the center of the excerpt, and one leg extending in the dominant direction, and the other leg extending in the secondary direction.

In yet another method, a traveling salesman solver is used to evaluate different routings between mark locations, as detailed above. However, such solver does not simply seek to minimize the travel time; it also seems to maximize correlation between the resulting tail orientations and the corresponding continuous-tone signal being mimicked. A balance can be mathematically struck, depending on application requirements, between fastest etching time, and best fidelity of the signal (i.e., best correspondence between tails of the mark and features of the signal being mimicked). For example, a metric for the solver to minimize may be the time for the laser to traverse and etch a candidate route, minus a weighted sum of the correlations between each of the marks-plus-tails produced by that candidate routing, with corresponding local regions of the local continuous-tone signal.

Figure 32A:
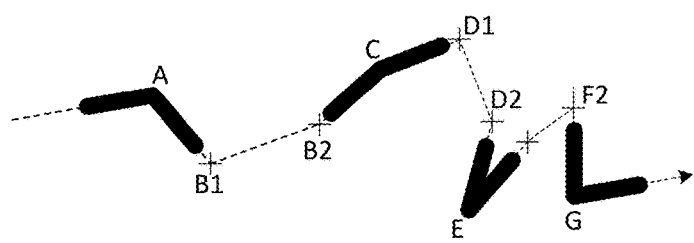
FIG. 32A shows a variant of the FIG. 32 routing, with two intermediate locations between each marking location.

It will be recognized that the laser path shown in FIG. 32 can be shortened. That is, the laser needn't travel all the way to point "B" (which is where the extended exit leg of one "V" crosses the extended entry leg of the next "V"). Instead, a shorter path can be used between the first two "V"s, as defined by locations B1 and B2 shown in FIG. 32A. Likewise with the other paths.

More generally, a modification of the traveling salesman method can be used. As is customary, the total path length is to be minimized, but the solution is subject to a further constraint: each mark has two orientations, and the path must approach each mark along one of its orientations, and exit from the mark along the other of its orientations.

Figure 33:
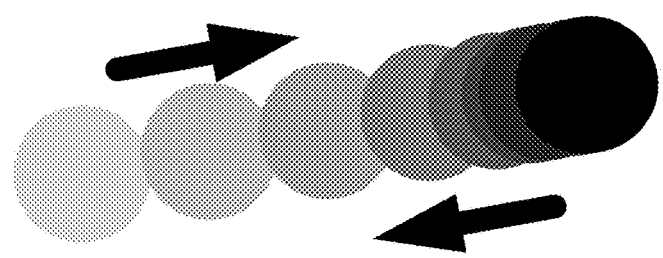
FIG. 33 shows a mark like FIG. 31 but with a single tail, produced by moving the marker so that its exit path from a marking location overlies its entry path.

In a variant embodiment, each mark has not two tails but one. This is arranged by moving the laser to the target position, and then moving the laser away from the target position, along the same path. This is schematically-illustrated by FIG. 33. The incrementally-stronger etching as the laser powers-on, moving to the right in the Figure, is reinforced at the end of the marking when the laser powers-off, moving to the left in the Figure, with incrementally-weaker etching.

Again, a continuous-tone signal tile can be modeled as an array of such single-tail marks, with the orientation of each mark's tail selected to best mimic a corresponding extremum of the continuous-tone signal.

An arrangement like that just-described can be employed. Extrema can be identified in the continuous-tone signal tile, and local excerpts can be analyzed to determine the dominant direction (the "primary ridge") of each. A mark is then placed at each extremum, oriented with its tail directed along the orientation of the primary ridge.

Figure 34:
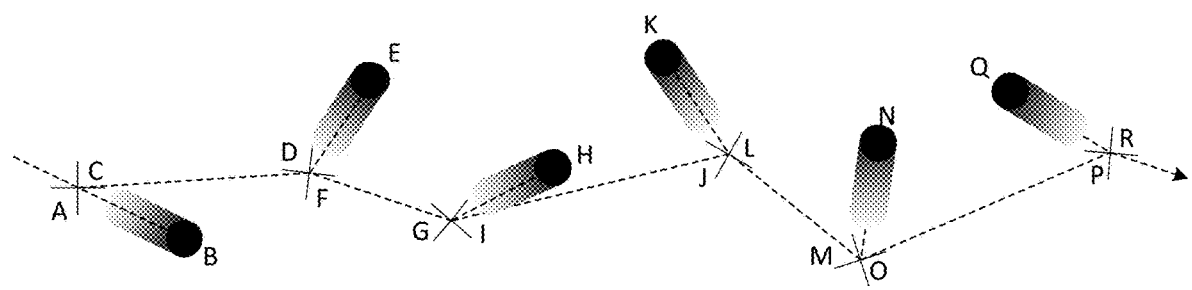
FIG. 34 shows a marking route that produces marks like that shown in FIG. 33.

FIG. 34 illustrates the concept. A laser apparatus is steered to location "A" and is switched on as it approaches location "B," forming a power-on tail. A mark is etched at "B." As the laser is moved from mark location "B" to the point "C" (co-located with location "A") the laser is turned off, producing a power-off tail that overlies the power-on tail.

From location "C" the laser is steered to an intermediate location "D" and then on to mark location "E"—again turning on as it approaches that mark location, forming a power-on tail. After etching a mark at location "E" the laser is turned off, just as it starts moving to location "F" (co-located with location "D"). The resulting power-off tail overlies the power-on tail.

The process continues in this fashion, steering from intermediate location "F" to another intermediate location "G," and then moving to a mark location "H" while forming a power-on tail. After etching a mark at location "H" the laser is powered-off and leaves a power-off tail as it moves to an intermediate location "I" (co-located with location "G"). It moves on to a further intermediate location and the process repeats.

In accordance with a further aspect of the present technology, a watermark pattern is not approximated by a collection of marks with one or two tails of diminishing intensity. Rather, the pattern is approximated by a collection of squiggly lines, formed by a powered laser that is steered to a sequence of, e.g., a few to a few dozen or to thousands of successive points without turning off. FIGS. 3A and 3B give examples in which 1638 different points are visited. (Here, as in other embodiments, the laser can move at the same speed, both when turned-off and turned-on.)

2D signal patterns are commonly lumpy. That is, their dots or other component features are not uniformly distributed throughout a block. Rather, some regions have concentrations of signal, or clusters of elements—forming signal hotspots, while other regions are relatively empty.

Figure 35:
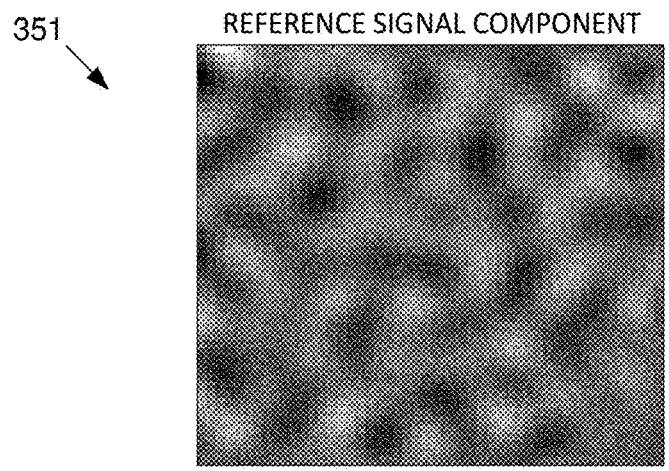
FIG. 35 shows a weighted combination of reference signal and interpolated payload component blocks to yield a continuous-tone 2D signal pattern.
Figure 35:
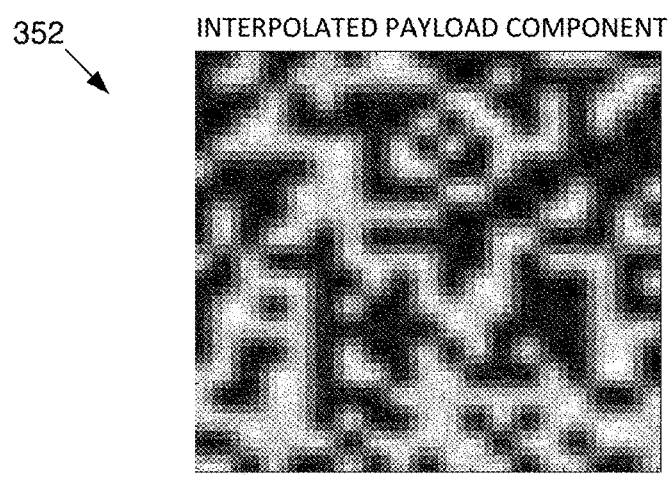
Figure 35:
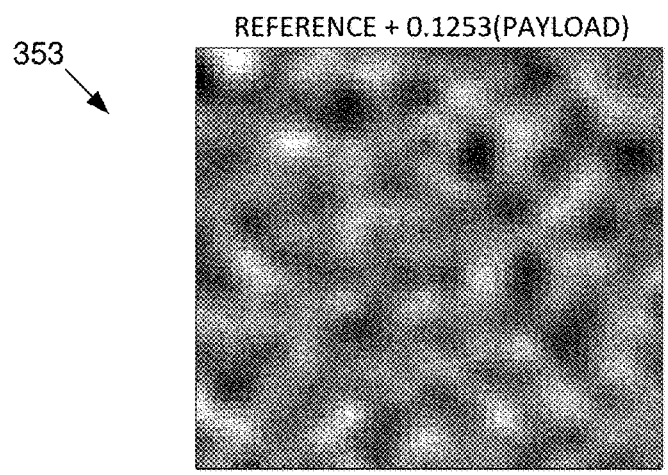

FIG. 35 illustrates. At the top is a 2D reference signal 351. In the middle is a 2D payload signal 352, after interpolation to match the size of the reference signal. At the bottom is a weighted sum 353—a continuous-tone 2D signal. As is evident, signal 353 has dark excerpts and light excerpts—it is not a homogeneous mixture of mid-grays. For our purposes, the dark regions are the signal hotspots. (An inverse pattern can alternatively be formed, in which case the light regions would be the signal hotspots.)

Figure 36:
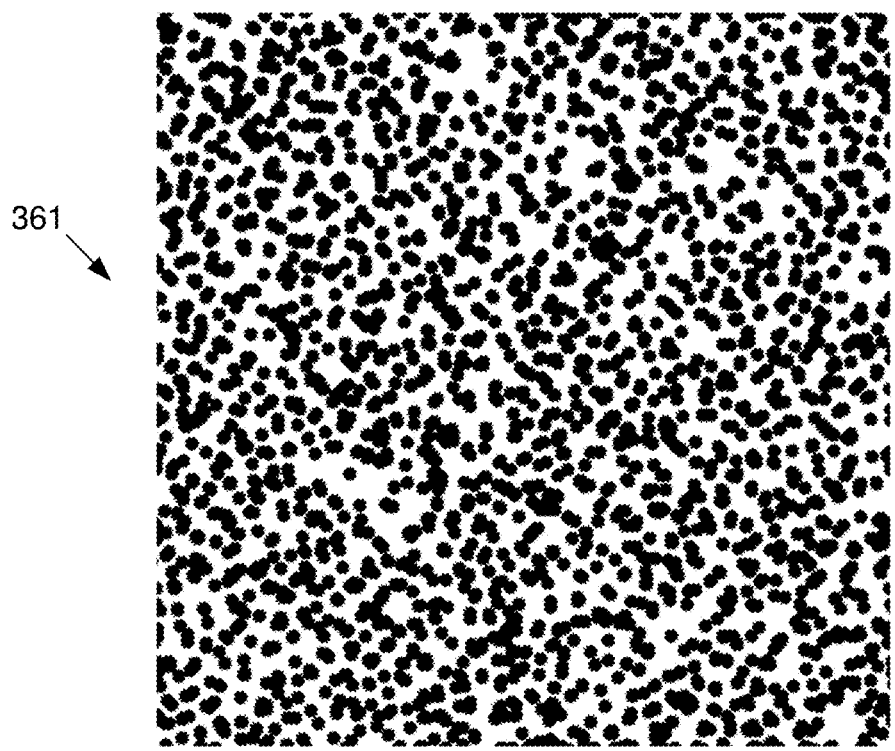
FIG. 36 shows an illustrative binary mark in which dots are located to form a lumpy appearance (a "connected binary" mark).

FIG. 36 shows a binary 2D signal 361, derived from a continuous-tone signal like signal 353 of FIG. 35. (This signal is produced by a method detailed in patent publication 20210387399.) Some local areas have a concentration of dots, while other areas have relatively fewer dots.

In both signals 353 and 361, relatively darker regions can be identified, in distinction from relatively lighter regions. In signal 353, for example, this can be done by a simple threshold test. All regions darker than a threshold value (e.g., 70 in a 0-255 greyscale range) are identified as relatively darker.

In signal 361, a region-growing algorithm can be applied to identify zones of adjoining dark dots—hotspot regions. One such algorithm is to start in the upper left corner and raster scan across, and then down, to find a first dot or other mark feature. Once a first dot is found, a neighborhood of up to 8 adjoining locations (including corner-adjoining) is examined, or up to 4 edge-adjoining locations, to identify which have dots. For each adjoining dot, its neighbors are similarly examined. A region of adjoining dot locations is thereby found—with each dot location being added to a clump (cluster) list, and removed from further consideration. After no more adjoining dots are found, exploration of this first clump concludes, and the raster scan resumes—searching for another dot in a part of the block not already considered. When found, a second clump is thereby seeded, and neighboring locations not previously explored are examined to grow a second clump region. This process continues until the entire block has been examined.

The result is a list of clumps. Some may comprise a single dot. Other may comprise a dozen or more. The list of clumps is then ranked by size—largest first.

A decision is next made about how many clumps from the list to select for marking by squiggle lines. As in the earlier examples, this choice is guided based on factors such as desired signal strength and aesthetics. As before, between 150 and 2500 waxel locations might be marked in an illustrative embodiment. Clumps are chosen from the top of the list until the clumps—in the aggregate—comprise the desired number of waxels to be marked.

In a particular embodiment, the clump nearest the upper left corner of the block is processed first, with a laser etching line being routed through the clump using a traveling salesman algorithm, visiting every waxel location in the clump—thereby forming a first squiggle. (As a constraint on the routing algorithm, the route may be prohibited from passing through any waxel region without a mark.)

After the first clump is routed in this fashion, the selected clump nearest the ending location of the first clump route is next-routed, starting from the mark closest to the ending location.

Figure 37:
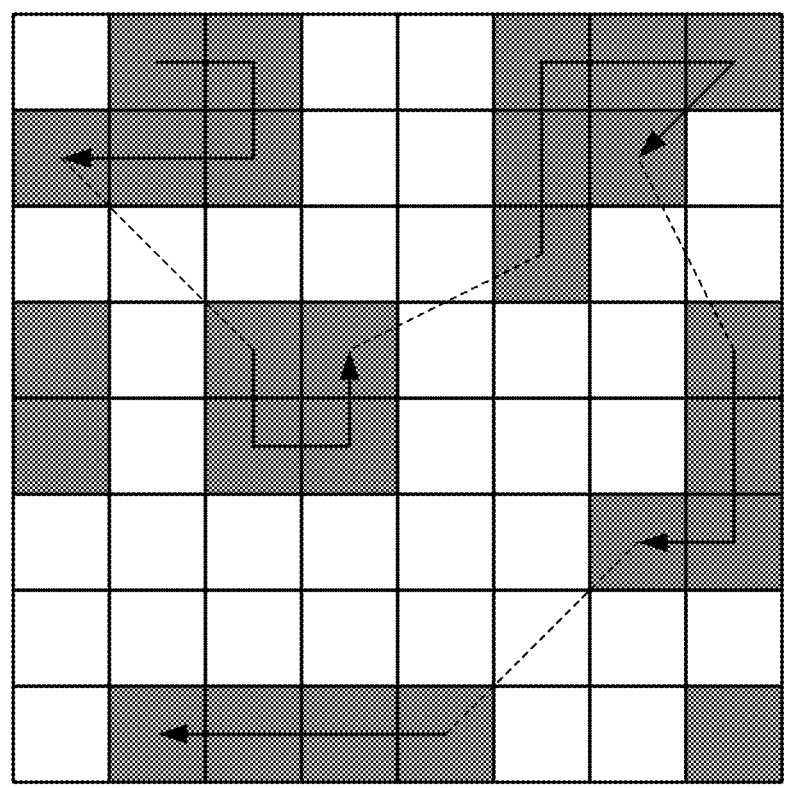
FIG. 37 shows how squiggle etching lines may be routed through hotspot regions of a 2D mark.

FIG. 37 illustrates the process, with the cluster in the upper left routed first, as shown by the solid line, and with jumps between clumps shown in dashed lines. Some smaller clumps are not routed, as the target number of marked waxel locations is reached using larger clumps alone.

In the jumps between clumps the laser may be turned off. However, applicant has found that the crossings of white areas with the laser turned on comprise a sufficiently small fraction of the laser travel that marking in such areas does little to degrade the mark. Thus, for sake of speed, the laser is commonly left energized for some, most, or all such jumps.

That is, some embodiments of the technology are characterized by laser etching through regions that are not dark, but rather are among the lightest 50%, 25%, or even 10% of the locations in the corresponding continuous tone signal.

In some arrangements, a traveling salesman algorithm is applied at two different phases in the process of defining etching instructions. One determines, given a defined set of multiple clumps, the order in which the laser should visit the clumps. (The example above simply started in one corner, and progressed to successive clumps based on proximity to the previous clumps' ending locations. But such approach does not typically yield the shortest path length.) The other phase determines, within each clump, the order in which the laser should visit the individual waxel locations comprising the clump.

In a variant embodiment, the squiggles do not begin and end in the center of waxels, but each waxel is spanned from side to side (or corner to corner) by a laser marking line. In still other embodiments, loops or other figures are etched within some or all of the waxels to be marked, since the more area that is etched, the stronger will be the signal. If desired, the amount of etching at a waxel location can be proportional to the continuous-tone pattern strength at that waxel location. (The amount of etching can be varied by varying the length of a squiggle around a location, or by varying the laser power—waxel by waxel.)

Figure 38:
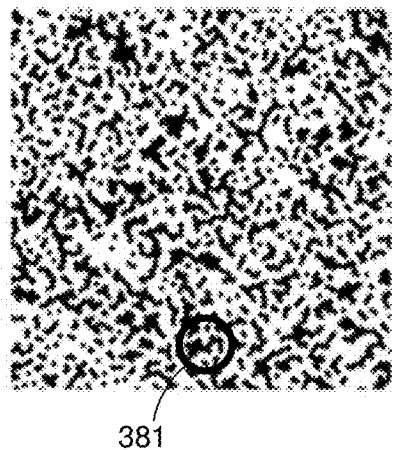
FIG. 38 shows another connected binary pattern, produced using morphological operations (e.g., erosion and dilation).
Figure 38A:
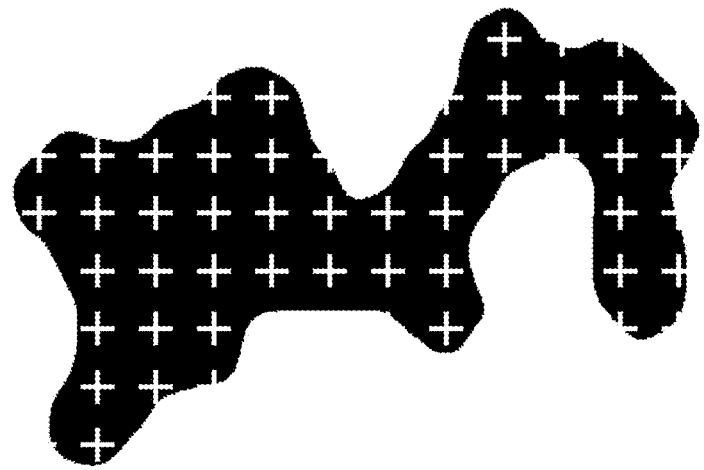
FIG. 38A shows how a clump of a binary signal pattern (enlarged from FIG. 38) can serve as a mask to identify waxel locations that should be visited by a routed line to form a squiggle.

Published patent application 20210387399 teaches how a connected binary pattern can be derived from a continuous-tone pattern. (An excerpt is found in the section entitled Connected Binary Pattern, below.) A pattern like that shown in FIG. 36 results. Morphological filtering, such as erosion followed by dilation, can grow the connected regions and remove the isolated dots, yielding a pattern like that shown in FIG. 38. Such pattern typically comprises relatively large dark clumps (one of which is located in the center of the circle 381 at the bottom center of FIG. 38), with a few isolated single dots. The remaining clumps—such as the one shown in circle 381—and shown in magnified form in FIG. 38A—can then be applied as a mask against a uniform 2D array of waxel locations (shown as white plus signs). These waxel locations corresponding to the mask then can be visited by a traveling salesman route, as described above, to define a squiggle corresponding to the clump.

(Such morphological filtering operation is another technique that can be used to reduce path length and speed etching. Since isolated marks are removed, less travel is required.)

In this case, as in others, a traveling salesman route may give preference to diagonal connecting lines rather than straight connecting lines, in situations (as discussed above) in which a diagonal line takes no more time to form than a straight line, yet yields a longer line. The longer the line, the more signal.

Figure 39A:
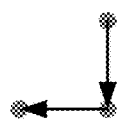
FIGS. 39A and 39B illustrate two different routing traces between a set of three locations, with one having a greater signal strength (length) than the other.
Figure 39B:
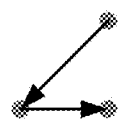

An example is shown in FIGS. 39A and 39B. Three locations on a plastic substrate are to be connected by laser-etched traces. The route shown in FIG. 39B takes the same time to etch as the route in FIG. 39A (since the horizontal component of the diagonal movement comes "free" of any time beyond that already needed for the vertical movement), yet provides more signal.

As noted, in some embodiments, the laser is not turned-off during jumps between clumps; the slight degradation to the signal caused by etching intermediate regions is handled by error correction. In a variant of such embodiment, the laser remains on during jumps between clumps, but the jump is placed (e.g., by traveling to an intermediate location) to avoid a region in the block where marking should particularly be avoided, such as the whitest areas in the continuous-tone pattern 353.

Figure 40:
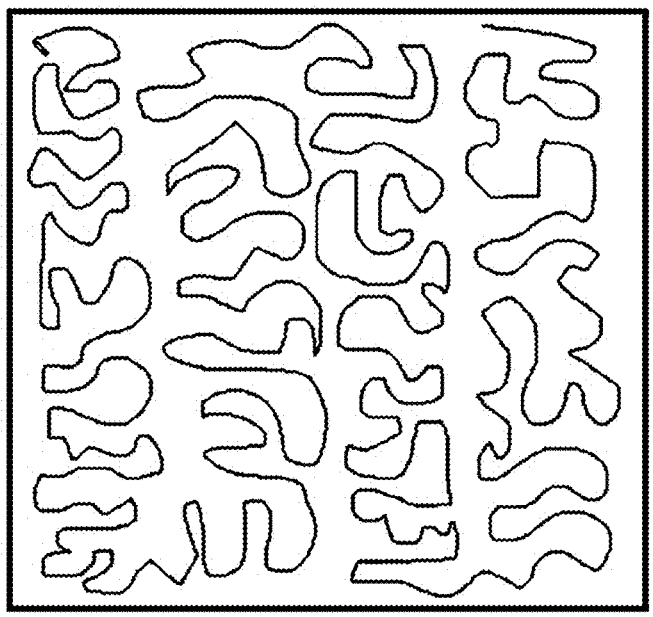
FIG. 40 conceptually illustrates how squiggles can be routed in vertical swaths.

In some other embodiments, (like that shown in FIGS. 27A and 27B), a single laser travel path does not freely traverse the entire signal block, as a traveling salesman algorithm might normally indicate. Instead, the block is divided into swaths, e.g., of a quarter or half inch, or more, and each swath is routed separately. FIG. 40 shows this conceptually.

Connected Binary Pattern

The following discussion is adapted from disclosure in U.S. application 63/076,917.

An exemplary connected binary pattern method first defines a binary template of a mark shape, e.g., a round dot. (Other mark shapes can naturally be used.) For a round dot, the approximation of FIG. 41 can be used. This FIG. 41 template, or stamp, spans an area of 7×7 (L×L) elements which, at 600 to the inch, yields an approximation of a circle having a diameter of 0.01166 inches.

A continuous-tone signal pattern block is created, as before. We use as exemplary a 128×128 payload array, to be rendered at 150 WPI, in a coordinate space having a resolution of 600 DPI, yielding an array of 512×512 (K×K) non-binary values. We term this array ContSignalTile.

Figure 41:
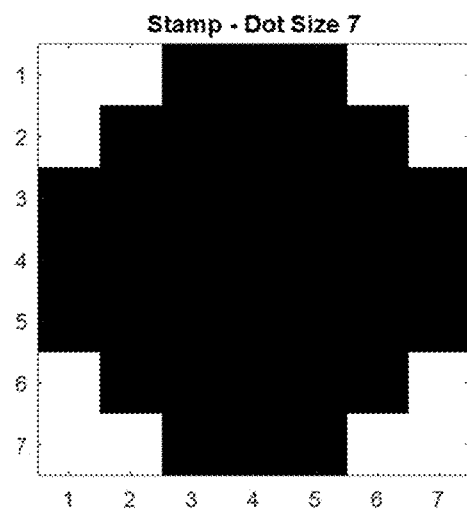
FIG. 41 shows a template of a mark, defined by an array of elements.

(In this arrangement a single waxel spans a 4×4 element area; thus the template stamp of FIG. 41 is larger than a single waxel.)

We define an initially-empty output signal block (i.e., all locations having a first binary value), termed BinSignalTile, the same size as the continuous-tone signal pattern block: 512×512. Before placing each mark, we compute three 512×512 arrays of values that are used, as described below, to decide the location at which the mark (i.e. the FIG. 41 stamp) should be placed. Each array has a value, at coordinate location i,j, as follows:

In the first array, termed NumMarkedPixels, the value at location i,j is the number of pixels (elements) that would turn black if the stamp is placed (i.e., centered) at that location. Initially, all values in this array have a value of 37—the number of black elements in the stamp. (The 7×7 array includes 12 white elements.) As stamps (marks) are placed in the output signal block, the values in the NumMarkedPixels array at some locations diminish since certain stamp placements will overlap with previously-placed stamps. (At edges of the K×K array we modulo-back to the opposite edge, as if the block were tiled with identical other such blocks.)

In the second array, termed StampScore, the value at location i,j is the sum of the 49 (i.e., L-squared) values in the continuous-tone signal pattern array ContSignalTile under the black stamp, if the stamp is placed at that location.

In the third array, termed NormalizedStampScore, the value at location i,j is the ratio between spatially-corresponding values in the other two arrays, i.e., StampScore/NumMarkedPixels. (This value is set to zero if NumMarkedPixels for a location is zero.)

The largest value in the third array is identified. Its i,j coordinates indicate the stamp location that will yield the most signal per unit area. The stamp is applied at this location in the output signal block, BinSignalTile, with corresponding elements turned black (i.e., set to a second binary value opposite the first). This operation essentially logically ORs the stamp pattern with the BinSignalTile pattern. The result is stored as the then-Current BinSignalTile pattern. All locations in the continuous-tone signal pattern array ContSignalTile, spatially-corresponding to the just-placed stamp, are then zeroed, to prevent that location from being selected a second time.

The process repeats, with the re-computation of the three just-described arrays, etc., until a number of stamping iterations or other threshold (e.g., a number of marked elements) is reached. (Typically, the three arrays are not wholly recomputed; rather, the values at the id locations affected by the just-placed stamp are recomputed, thereby updating the arrays.)

Figure 43:
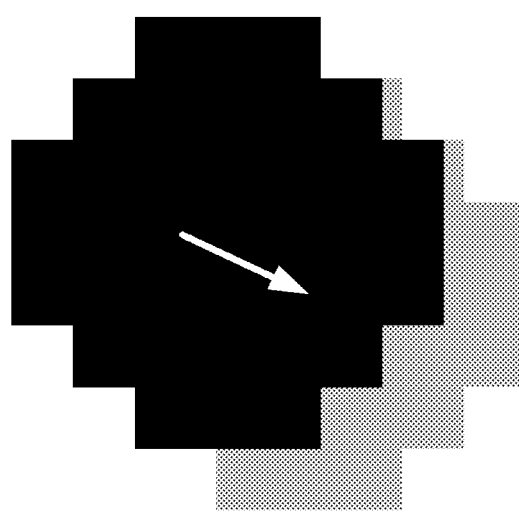
FIG. 43 illustrates how the template of FIG. 41 may be applied in overlapping fashion.
Figure 42:
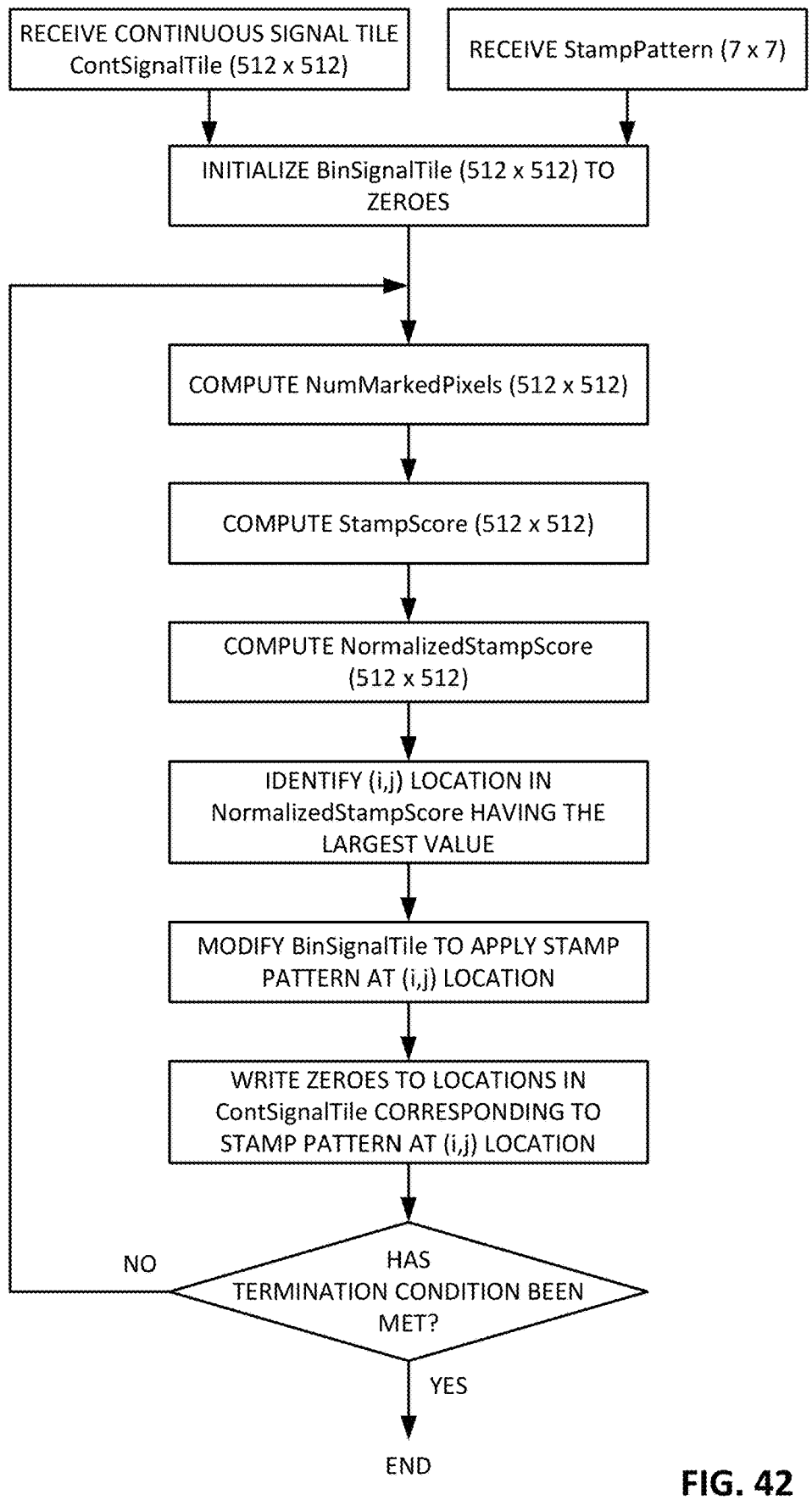
FIG. 42 details an algorithm to yield a one form of connected binary mark.

Such algorithm is illustrated in FIG. 42. An exemplary application of the algorithm yields a pattern like that shown in FIG. 36. Marks may overlap, as shown in FIG. 43. If morphological filtering is applied, a pattern like that shown in FIG. 38 results.

Polishing, Etc.

It is sometimes necessary to smooth a laser-shaped mold, especially when it is to be used in the production of containers formed of clear plastic. If the mold is not sufficiently smooth, the plastic can appear cloudy.

One approach is to anodize the laser-shaped mold surface. The anodization layer serves to conceal the laser-shaped surface with an overcoat that is smoother.

Another approach is to treat the laser-shaped mold surface with an acid bath. The acid first eats away very fine metal features, e.g., those in the nature of manufacturing artifacts, while leaving the larger structures (e.g., protrusions that will form indentations in molded plastic).

Yet another approach is to slow the laser marking process—permitting the metal to heat to a liquid state and flow, which serves to smooth rough features that can be left by faster marking.

Still another approach is by laser polishing, using ultra-short UV pulses (e.g., of 80 micron or shorter wavelength) that are repetitively applied at high frequencies (e.g., between 1 and 100 MHz). At such frequencies, energy deposited by a pulse does not dissipate (by thermal conduction) before the next pulse arrives—a few nano seconds later. A local heat accumulation arises, causes successive pulses to illuminate a locally-preheated area. The temperature rises, causing a film of molten material to form. The pulse timing and energy are selected so that the mold metal heats to the temperature of flow, but not metal evaporation.

Concluding Remarks

Having described and illustrated the principles of applicant's inventive work with reference to illustrative features and examples, it will be recognized that the technology is not so limited.

For example, while the specification describes various techniques independently, applicant intends that they be used in combination. For example, the path-optimized patterns of FIGS. 5 and 13 can be etched using multiple lasers as shown in FIG. 27A. The angled marks of FIG. 4 can be formed in vertical swaths per FIG. 5, using the large dimensions discussed in connection with FIG. 25. Each of the detailed techniques helps speed etching; fastest etching is achieved by using multiple techniques together.

Similarly, while the specification speaks of marks being placed at locations corresponding to minima in a continuous-tone watermark signal (i.e., the smallest, or most negative values—indicating the darkest locations), the opposite approach can be employed. Marks can instead be placed in a binary watermark pattern at locations where the corresponding continuous-tone watermark is light instead of dark. (Imaging of etched plastics often yields an inversion, in which the etched marks appear light against a darker background of surrounding unetched, smooth plastic surface. Thus, many watermark detectors look for signals expressed in both forms: normal and inverted.)

The specification refers, at times, to vertical and horizontal. It will be recognized that these are arbitrary, depending on the frame of reference. Typically, arrangements that are described using a "vertical" qualifier can similarly be implemented using a "horizontal" qualifier (e.g., as in the directions of the swaths in the mark of FIG. 5).

The repeated reference to a watermark pattern comprising a square 128×128 array of locations is for purposes of illustration only. A watermark pattern can comprise a larger or smaller array of locations, and need not be square in shape.

Although the described embodiments employ a reference signal comprised of peaks in the spatial frequency (Fourier magnitude) domain, it should be recognized that reference signals can exhibit fixed features in different transform domains by which geometric synchronization can be achieved.

Relatedly, it is not necessary for a digital watermark signal to include a distinct reference signal for geometrical synchronization purposes. Sometimes the payload portion of the watermark signal, itself, has known aspects or structure that enables geometrical synchronization without reliance on a separate reference signal.

The term "watermark" commonly denotes an indicia that escapes human attention, i.e., is steganographic. While steganographic watermarks can be advantageous, they are not essential. Watermarks forming overt, human-conspicuous patterns, can be employed in embodiments of the present technology.

For purposes of this document, a watermark is a 2D code produced through a process that represents a message of N symbols using K output symbols, where the ratio N/K is less than 0.25. (In convolutional coding terms, this is the base rate, where smaller rates indicate greater redundancy and thus greater robustness in conveying information through noisy "channels"). In preferred embodiments the ratio N/K is 0.1 or less. Due to the small base rate, a payload can be decoded from a watermark even if half of more (commonly three-quarters or more) or the code is missing.

As indicated, in one particular embodiment, 47 payload bits are concatenated with 24 CRC bits, and these 71 bits ("N") are convolutionally encoded at a base rate of 1/13 to yield 924 bits ("K"). A further 100 bits of version data are appended to indicate version information, yielding the 1024 bits referenced earlier (which are then scrambled and spread to yield the 16,384 values in a 128×128 continuous tone watermark).

Some other 2D codes make use of error correction, but not to such a degree. A QR code, for example, encoded with the highest possible error correction level, can recover from only 30% loss of the code.

Preferred watermark embodiments are also characterized by a synchronization (reference) signal component that is expressed where message data is also expressed. For example, every mark in a most watermarks is typically a function of the synchronization signal. Again in contrast, synchronization in QR codes is achieved by alignment patterns placed at three corners and at certain intermediate cells. Message data is expressed at none of these locations.

The spot size produced in many laser marking machines is one the order of a few microns, which can be small for the arrangements detailed herein. To mark plastic bottles, the spot is typically defocused to spread the energy over a larger area.

Alternatively, in some embodiments, a mark within a binary watermark pattern may be formed by a cluster of small laser-marked features—connected or independent—within a waxel cell, each spanning an area much smaller than the waxel cell (e.g., each spanning less than 20%, or even less than 5% or 2%, of the waxel area). In other embodiments, a mark can span an area larger than a waxel identified for marking.

Some items are marked with a serialized 2D code pattern, which serves as a background for static (i.e., invariant item-to-item) graphics, such as text or a logo. In such arrangements, a keep-out buffer zone, without code marking, surrounds the static graphic(s). That is, the code is masked-out by the graphic(s) and buffer zone. In such case the code pattern may be routed, e.g., by a TSP algorithm or one of the other techniques detailed above, after masking—to find the quickest etching path that excludes the areas that won't be marked with the 2D code. Marking can then proceed with the masked-out code pattern area first, followed by the static graphic(s), or vice-versa.

In some embodiments, the outlines of static graphics, such as text characters and logos, are filled with 2D code pattern. In this case, the text/logo serves as a mask to define where the code pattern is present—rather than where it is absent. Again, the code pattern regions can be TSP- or otherwise-routed after such masking, to determine the quickest etching path.

This specification uses the term "laser etching." Some may draw distinctions between etching, engraving, scribing, etc. Applicant here regards these terms as synonymous.

Reference was made to shortening path length by reducing dot density, e.g., from 20 to 14, with an accompanying increase in mark size. A related approach is to reduce the watermark pattern resolution, e.g., from 150 waxels per inch (WPI) to 75 WPI. This causes the number of marks in each watermark block to go down, diminishing path length for a fixed area of marking. For example, when marking an area of one square inch, applicant found that reducing the resolution from 150 to 75 WPI causes the path length to fall by 49%. (This also increases the size of each waxel, yielding an increased in mark size.)

Reducing the watermark resolution works well to reduce path length if an area of fixed size is to be marked, such as one square inch (or the entire surface of the item). If there is flexibility in the size of the area to be marked, then a contrary approach can be used—increasing the watermark pattern resolution, such as from 150 WPI to 200 WPI. A single block of the watermark pattern (e.g., corresponding to an array of 128×128 locations) is thereby reduced in size, from 0.85 inches on a side to 0.6 inches on a side. The etching path length and etching time are reduced accordingly.

If a laser is mirror-scanned over a substrate that varies in distance from the laser (e.g., as can be the case in marking the cylindrical side surface of plastic bottles), the intensity of the laser can be modulated in accordance with the distance variation, to assure a substantially uniform heating of the surface despite such variation.

Some lasers can be steered not only in two orthogonal dimensions; the focal point can also be steered in the third orthogonal direction (physically, or by electronically-controlled variation of the focal plane).

Reference was made to certain of the detailed binary watermark patterns being sub-optimal. It is sometimes useful to have an approximation metric (fidelity metric) indicating how faithfully a binary watermark pattern represents a continuous tone watermark pattern to which it corresponds. One such metric is to sample signal values from the continuous-tone watermark signal at node locations that are marked in the binary watermark pattern, determine the difference of each such signal value from 255 (to convert the darkest-valued locations into the highest values), and sum these difference values. The greater the sum, the more closely the binary pattern approximates the continuous-tone pattern. When comparing two binary watermark patterns of the same size and mark count, the pattern with the higher approximation metric is the more accurate, or optimum, of the two. If there exists a binary watermark pattern of the same size and mark count having a metric that is higher than that of a subject pattern, then the subject pattern is sub-optimal.

Applicant's prior work, detailed in the cited references, sometimes imposed a keep-out constraint on mark placement, to avoid clumping of marks (for aesthetic reasons). Naturally, no keep-out constraint is employed in embodiments in which clustering is intended, although keep-out constraints may be employed in other embodiments.

In some applications the exact symbol contents of encoded payloads aren't critical. What is important is that each item be marked with a different payload, to effect serialization. This flexibility in payloads offers another approach to path length optimization. That is, the technology can select payloads—from a universe of possible payloads—that yield shorter etching times. Such payloads can be discovered in brute force experimental fashion, by trying different payloads and noting which yield the shortest etching time.

There is sometimes a semantic quandary when describing dimensions of a laser-etched mark. If a mark is made by a laser spot having a diameter of two waxels, and the laser beam is moved a distance of 0.5 waxels while activated, the mark may be said to have a size of 2.0×0.5 waxels. But in actuality the laser-heating of the substrate spans an area of 2.0×2.5 waxels. This is not a hindrance to any of the detailed arrangements, but rather just an aspect that should be taken into account. A related issue is that the energy absorbed by a target substrate from a moving laser spot varies with lateral distance from the movement axis. Again, this is an issue that is addressed as may be needed in particular implementations. (In some embodiments the profile of energy across the spot is shaped, e.g., by diffractive optics, to increase the light energy towards the periphery of the spot.)

The use of a carbon dioxide laser having a 9.3 µm is exemplary only. Other types of lasers, and other wavelengths, can naturally be employed, including UV lasers, e.g., at 355 nm.

Laser marking systems from different vendors, and even systems from a single vendor, vary in numerous parameters. Examples include the laser travel speed when marking, the laser travel speed when moving (not marking), the power-on ramp-up of laser energy, the power-off decay of laser energy, the dwell time to etch a dot, the usual wait time allowed for settling of the laser position after moving, the usual wait time allowed for power-off decay of laser energy before moving, the etching width when the laser beam is activated in steady state, the energy distribution density across the laser spot, etc. In devising control instructions to etch a 2D signal pattern conveying a particular payload, it is common for the artisan to devise different control instructions for different systems, so as to yield the quickest etching speed on each type of system.

It will be understood that the power-on and power-off laser intensity ramps are often not linear. Typically they exhibit some form of exponential behavior.

As is familiar, laser etching machines commonly operate on a sequence of instructions that identifies locations to be visited, e.g., by x/y coordinates, together with associated instructions (in some embodiments) that control turning-on and turning-off of the laser. Other parameters are typically user-set once, and persist for the remainder of a job. These can include laser beam width, focal length, dwell time at marking locations, laser speed during moves without marking, and laser speed during moves with marking. Other parameter may not usually be user-settable (e.g., settle time after moving to a location and beginning marking), but can be manually overridden. One suitable format for the sequence of location/marking instructions is a DXF file. (The nearly 300 page specification for DXF is freely available from Autodesk on its website.)

Patterns that can be used for laser marking include "signal rich art" patterns, such as are detailed in U.S. patent publications 20190213705, 20190378235 and 20200311505, and in pending application Ser. No. 17/516,464, filed Nov. 1, 2021 (published as US 2022-0138892 A1).

Although this specification has repeatedly referenced plastic bottles, it will be recognized that the technology can be used in conjunction with any plastic items, e.g., trays, pouches, cups, transport containers, etc. Moreover, it will be recognized that the technology can be used in connection with non-plastic items, such as glass, metal, paper, etc. Components of cars, planes, bicycles, etc., are among some of the non-plastic items that may be so-marked.

Still further, metal molds that are used for thermoforming or injection molding of plastic parts and containers can be marked using the arrangements detailed herein. For example, the present methods can be applied in marking the injection molding substrates detailed in pending application Ser. No. 17/835,775, filed Jun. 8, 2022. In some such mold marking arrangements, artistic texture patterns are adapted to convey watermark signals, e.g., using the signal rich art methods noted above.

Mold materials other than metal can also be marked by the methods detailed herein. Examples include ceramics and reinforced resins. In some processes, a metal mold defines the gross shape of an item, and the finer, surface finish of the item is defined by an insert within the mold that may be formed of a material such as a ceramic- or metal reinforced resin and that is shaped in accordance with the above-detailed methods. The insert can be removable to permit different finishes to be applied, without changing the metal mold. Particular arrangements are detailed in publication 20220331841 and pending application Ser. No. 17/952,066, filed Sep. 23, 2022.

It will be understood that the methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The methods and algorithms detailed above can be implemented in a variety of different hardware processors, including a microprocessor, an ASIC (Application Specific Integrated Circuit) and an FPGA (Field Programmable Gate Array). Hybrids of such arrangements can also be employed.

By microprocessor, applicant means a particular structure, namely a multipurpose, clock-driven integrated circuit that includes both integer and floating point arithmetic logic units (ALUs), control logic, a collection of registers, and scratchpad memory (aka cache memory), linked by fixed bus interconnects. The control logic fetches instruction codes from an external memory, and initiates a sequence of operations required for the ALUs to carry out the instruction code. The instruction codes are drawn from a limited vocabulary of instructions, which may be regarded as the microprocessor's native instruction set.

A particular implementation of one of the above-detailed processes on a microprocessor—such as selecting marks in clustered arrangement—involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangement allows multiple operations to be executed in parallel. (Some elements—such as the bus structure and cache memory may be shared between the cores.)

Examples of microprocessor structures include the Intel Xeon, Atom and Core-I series of devices, and various models from ARM and AMD. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data. Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of certain of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to select mark locations in clusters, and programmed tomorrow to prepare a user's tax return, an ASIC structure does not have this flexibility. Rather, an ASIC is designed and fabricated to serve a dedicated task. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of watermark detectors and decoders offer higher performance, and consume less power, than implementations employing microprocessors. A drawback, however, is the significant time and expense required to design and fabricate circuitry that is tailor-made for one particular application.

A particular implementation of any of the above-referenced processes using an ASIC again begins by defining the sequence of operations in a source code, such as MatLab or C++. However, instead of compiling to the native instruction set of a multipurpose microprocessor, the source code is compiled to a "hardware description language," such as VHDL (an IEEE standard), using a compiler such as HDL-Coder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, an external memory. By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Intel, and the Spartan FPGA from Xilinx.

As with the other hardware structures, implementation of the above-detailed processes on an FPGA begins by describing a process in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Still another type of processor hardware is a neural network chip, e.g., the Intel Nervana NNP-T, NNP-I and Loihi chips, the Google Edge TPU chip, and the Brainchip Akida neuromorphic SOC.

Software instructions for implementing the detailed functionality on the selected hardware can be authored by artisans without undue experimentation from the descriptions provided herein, e.g., written in C, C++, Visual Basic, Java, Python, Tcl, Perl, Scheme, Ruby, Caffe, TensorFlow, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: local device, remote device, in the cloud, distributed, etc.

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention.

The invention claimed is:

1. A system for marking a workpiece, the system comprising first and second laser emitters and a controller, the controller being configured by control instructions to direct laser illumination from said laser emitters to locations on the workpiece at which marks are to be formed, wherein said control instructions configure the laser emitters to turn on and off independently of each other, yet the marks formed by the first and second laser emitters cooperate to form an area of 2D machine-readable coding from which a plural symbol payload is extractable by a compliant decoder.

2. The system of claim 1 including a rotary turntable for receiving a generally-cylindrical workpiece, and a drive arrangement that moves the laser emitters in a first direction parallel to an axis of the turntable, said controller being configured to jointly operate said turntable and said drive arrangement to direct the laser illumination from said laser emitters to locations on the cylindrical workpiece at which said marks are to be formed.

3. The system of claim 1 including a drive arrangement that moves the emitters in one direction, and a mirror arrangement that effects redirection of the laser illumination in a second, orthogonal direction.

4. The system of claim 3 in which there are two mirror arrangements, one for each laser emitter, that are configured by said instructions for independent redirection.

5. The system of claim 4 in which said instructions configure the mirror arrangement for each laser emitter to direct a laser beam to a sequence of locations based on proximity of marks, and not based on a raster pattern.

6. The system of claim 3 in which the drive arrangement moves the emitters in a vertical direction, and the mirror arrangement effects a raster redirection of the laser illumination in a horizontal direction.

7. The system of claim 1 in which the controller is configured to cause the first and second laser emitters to simultaneously mark spaced-apart first and second locations on the workpiece at a first time, and to cause the first but not the second laser emitter to mark a third location on the workpiece at a second time, and to cause the second but not the first laser emitter to mark a fourth location on the workpiece at a third time.

8. The system of claim 1 in which the first laser emitter is nominally directed in a first direction, and the second laser emitter is nominally directed in a second direction, wherein the first and second directions are non-parallel.

9. A process of marking a plastic container with 2D code information, the process including the acts:
   generating two or more laser beams, the beams being identically modulated in intensity over time; and
   steering the beams simultaneously to sequences of different locations on the container, to thereby laser-etch identical spaced-apart patterns on the container, said patterns comprising said 2D code information;
   wherein the container is marked with redundant 2D code information patterns.

10. The process of claim 9 that includes rotating the plastic container continuously during said marking.

11. The process of claim 9 that includes rotating the plastic container step-wise during said marking.

12. The process of claim 9 in which the 2D code information includes plural identical 2D blocks of marks, disposed edge-to-edge.

13. The process of claim 9 in which the plastic container is a cylindrical bottle, and the process includes marking a majority of a cylindrical surface of the bottle with the 2D code information.

14. The process of claim 9 in which the plastic container is a cylindrical bottle having a circumference, and the 2D code information comprises a signal block sized to be an integral fraction of the bottle circumference, so that an integer number of signal blocks spans the bottle circumference.

15. An apparatus for marking a plastic container with 2D code information, the apparatus comprising:
    means for generating two or more laser beams, the beams being identically modulated in intensity over time; and
    means for steering the beams simultaneously to sequences of different locations on the container, to thereby laser-etch identical spaced-apart patterns on the container, said patterns comprising said 2D code information;
    whereby the container is marked with redundant 2D code information patterns.

16. The apparatus of claim 15 that includes means for rotating the plastic container continuously during marking with redundant 2D code information patterns.

17. The apparatus of claim 15 that includes means for rotating the plastic container step-wise during marking with redundant 2D code information patterns.

18. The apparatus of claim 15 in which the 2D code information includes plural identical 2D blocks of marks, disposed edge-to-edge.

19. The apparatus of claim 15 in which the plastic container is a cylindrical bottle, and in which said means for steering steers the beams to mark a majority of a cylindrical surface of the bottle with the 2D code information.

20. The apparatus of claim 15 in which the plastic container is a cylindrical bottle having a circumference, and the 2D code information comprises a signal block sized to be an integral fraction of the bottle circumference, so that an integer number of signal blocks spans the bottle circumference.

* * * * *